(12) United States Patent
Roberge et al.

(10) Patent No.: US 12,477,997 B2
(45) Date of Patent: Nov. 25, 2025

(54) BALE WRAP ASSEMBLY LOADING SYSTEM FOR AN AGRICULTURAL HARVESTER

(71) Applicants: CNH Industrial Canada, Ltd., Saskatoon (CA); CNH Industrial America LLC, New Holland, PA (US)

(72) Inventors: Martin J. Roberge, Quebec (CA); Scott Simmons, Lititz, PA (US)

(73) Assignees: CNH industrial Canada, Ltd., Saskatoon (CA); CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/925,343

(22) Filed: Oct. 24, 2024

(65) Prior Publication Data
US 2025/0136313 A1  May 1, 2025

Related U.S. Application Data

(60) Provisional application No. 63/594,588, filed on Oct. 31, 2023.

(51) Int. Cl.
*A01F 15/07* (2006.01)

(52) U.S. Cl.
CPC .... *A01F 15/0715* (2013.01); *A01F 2015/076* (2013.01)

(58) Field of Classification Search
CPC .... A01F 15/07; A01F 15/071; A01F 15/0715; A01F 2015/076; B65H 16/024; B65H 19/1868; B65H 2408/241
(Continued)

(56) References Cited

U.S. PATENT DOCUMENTS

| | | | |
|---|---|---|---|
| 4,697,402 A | 10/1987 | Anstey et al. | |
| 5,996,307 A | * 12/1999 | Niemerg et al. | .... A01F 15/0715 53/118 |

(Continued)

FOREIGN PATENT DOCUMENTS

| | | |
|---|---|---|
| EP | 1602269 | 12/2005 |
| EP | 1772408 | 4/2007 |

(Continued)

OTHER PUBLICATIONS

Screen captures from YouTube video clip entitled "Die neue Fendt Rotana | Fendt Rotana F | Folienbindung | Fendt", uploaded on Jul. 14, 2022, by Fendt TV. Retrieved from Internet: https://www.youtube.com/watch?v=zflRbKXn5Q8.

(Continued)

*Primary Examiner* — Stephen F. Gerrity
(74) *Attorney, Agent, or Firm* — Fletcher Yoder, P.C.

(57) ABSTRACT

A bale wrap assembly loading system for an agricultural harvester includes a storage compartment configured to store bale wrap assemblies. The storage compartment includes a frame, a bale wrap support rotatably coupled to the frame at a pivot point, a first bale wrap mount coupled to the bale wrap support and configured to support one or more first bale wrap assemblies, and a second bale wrap mount coupled to the bale wrap support and configured to support one or more second bale wrap assemblies. The bale wrap support is configured to rotate about the pivot point to orient the bale wrap support at a first loading angle to facilitate receiving the one or more first bale wrap assemblies at a loading location and to orient the bale wrap support at a second loading angle to facilitate receiving the one or more second bale wrap assemblies at the loading location.

20 Claims, 9 Drawing Sheets

(58) Field of Classification Search
USPC .................................... 53/587, 389.2, 389.4
See application file for complete search history.

(56) References Cited

U.S. PATENT DOCUMENTS

| | | | |
|---|---|---|---|
| 6,006,504 | A | 12/1999 | Myers et al. |
| 6,050,052 | A | 4/2000 | Herron et al. |
| 6,981,352 | B2 | 1/2006 | Chow et al. |
| 7,322,167 | B2 | 1/2008 | Chapon et al. |
| 7,409,814 | B2 | 8/2008 | Hood et al. |
| 7,430,959 | B2 | 10/2008 | Routledge |
| 7,644,559 | B2 | 1/2010 | Smith |
| 7,716,903 | B2 | 5/2010 | McClure et al. |
| 8,869,688 | B2 * | 10/2014 | Bruning .................. A01F 15/08 56/341 |
| 8,919,085 | B2 * | 12/2014 | Smith et al. ........ A01F 15/0715 53/587 |
| 8,925,287 | B2 | 1/2015 | Derscheid |
| 9,320,199 | B2 | 4/2016 | Smith et al. |
| 10,517,221 | B2 | 12/2019 | Thoreson et al. |
| 10,820,527 | B2 | 11/2020 | Anaparti et al. |
| 10,827,684 | B2 | 11/2020 | Roberge |
| 12,041,883 | B2 | 7/2024 | Roberge et al. |
| 2015/0296715 | A1 * | 10/2015 | Simmons et al. .. A01F 15/0715 56/341 |
| 2019/0166769 | A1 | 6/2019 | Little et al. |
| 2022/0248609 | A1 | 8/2022 | Roberge et al. |
| 2022/0256773 | A1 | 8/2022 | Ricketts et al. |
| 2022/0346321 | A1 | 11/2022 | Adam et al. |
| 2022/0356040 | A1 * | 11/2022 | Borchers et al. ... A01F 15/0715 |
| 2023/0085376 | A1 * | 3/2023 | Adam et al. ........ A01F 15/0715 56/341 |
| 2023/0371435 | A1 * | 11/2023 | Olsen .................... A01F 15/071 |
| 2024/0334879 | A1 | 10/2024 | Roberge |
| 2024/0341241 | A1 | 10/2024 | Roberge et al. |

FOREIGN PATENT DOCUMENTS

| | | | |
|---|---|---|---|
| EP | 2628379 | | 8/2013 |
| EP | 2769615 | | 8/2014 |
| EP | 2959767 | | 12/2015 |
| EP | 3785521 | | 3/2021 |
| EP | 3760029 B1 * | 5/2021 | ......... A01F 15/0715 |
| JP | 05097124 A * | 4/1993 | |

OTHER PUBLICATIONS

Screen captures from YouTube video clip entitled "Die neue Fendt Rotana | Rundballenpresse / The new Fendt Rotana | Roundballer | Fendt", uploaded on Jul. 14, 2022, by Fendt TV. Retrieved from Internet: https://www.youtube.com/watch?v=w6ummci5OXQ.

U.S. Appl. No. 18/925,275, filed Oct. 24, 2024, Martin J. Roberge.

U.S. Appl. No. 18/925,527, filed Oct. 24, 2024, Martin J. Roberge.

* cited by examiner

BALE WRAP ASSEMBLY LOADING SYSTEM FOR AN AGRICULTURAL HARVESTER

CROSS-REFERENCE TO RELATED APPLICATION

This application claims priority from and the benefit of U.S. Provisional Application No. 63/594,588, entitled "BALE WRAP ASSEMBLY LOADING SYSTEM FOR AN AGRICULTURAL HARVESTER," filed Oct. 31, 2023, which is hereby incorporated by reference in its entirety.

BACKGROUND

The present disclosure relates generally to a bale wrap assembly loading system for an agricultural harvester.

Agricultural harvesters are used to harvest agricultural products (e.g., cotton or other natural material(s)). For example, an agricultural harvester may include a header having drums configured to harvest the agricultural product from a field. The agricultural harvester may also include an air-assisted conveying system configured to move the agricultural product from the drums to an accumulator. The agricultural product may then be fed into a baler via a conveying system. The baler may compress the agricultural product into a package to facilitate storage, transport, and handling of the agricultural product. For example, a round baler may compress the agricultural product into a round bale within a baling chamber, such that the round bale has a desired size and density. After forming the bale, the bale may be wrapped with a bale wrap to secure the agricultural product within the bale and to generally maintain the shape of the bale.

BRIEF DESCRIPTION

In certain embodiments, a bale wrap assembly loading system for an agricultural harvester includes a storage compartment configured to store multiple bale wrap assemblies. The storage compartment includes a frame and a bale wrap support rotatably coupled to the frame at a pivot point. The storage compartment also includes a first bale wrap mount coupled to the bale wrap support and configured to support a first bale wrap assembly. In addition, the storage compartment includes a second bale wrap mount coupled to the bale wrap support and configured to support a second bale wrap assembly of the plurality of bale wrap assemblies. The first and second bale wrap mounts are positioned on opposite sides of the pivot point, and the bale wrap support is configured to rotate about the pivot point to orient the bale wrap support at a first loading angle to facilitate receiving the first bale wrap assembly at a loading location and to orient the bale wrap support at a second loading angle to facilitate receiving the second bale wrap assembly at the loading location. The bale wrap assembly loading system also includes a bale wrap support sensor configured to output a bale wrap support sensor signal indicative of an orientation of the bale wrap support. In addition, the bale wrap assembly loading system includes a controller communicatively coupled to the bale wrap support sensor. The controller includes a processor and a memory, and the controller is configured to determine the bale wrap support is oriented at the first loading angle based on the orientation of the bale wrap support. The controller is also configured to identify the first bale wrap assembly mounted on the first bale wrap mount in response to determining the bale wrap support is oriented at the first loading angle. Furthermore, the controller is configured to determine the bale wrap support is oriented at the second loading angle based on the orientation of the bale wrap support, and the controller is configured to identify the second bale wrap assembly mounted on the second bale wrap mount in response to determining the bale wrap support is oriented at the second loading angle.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
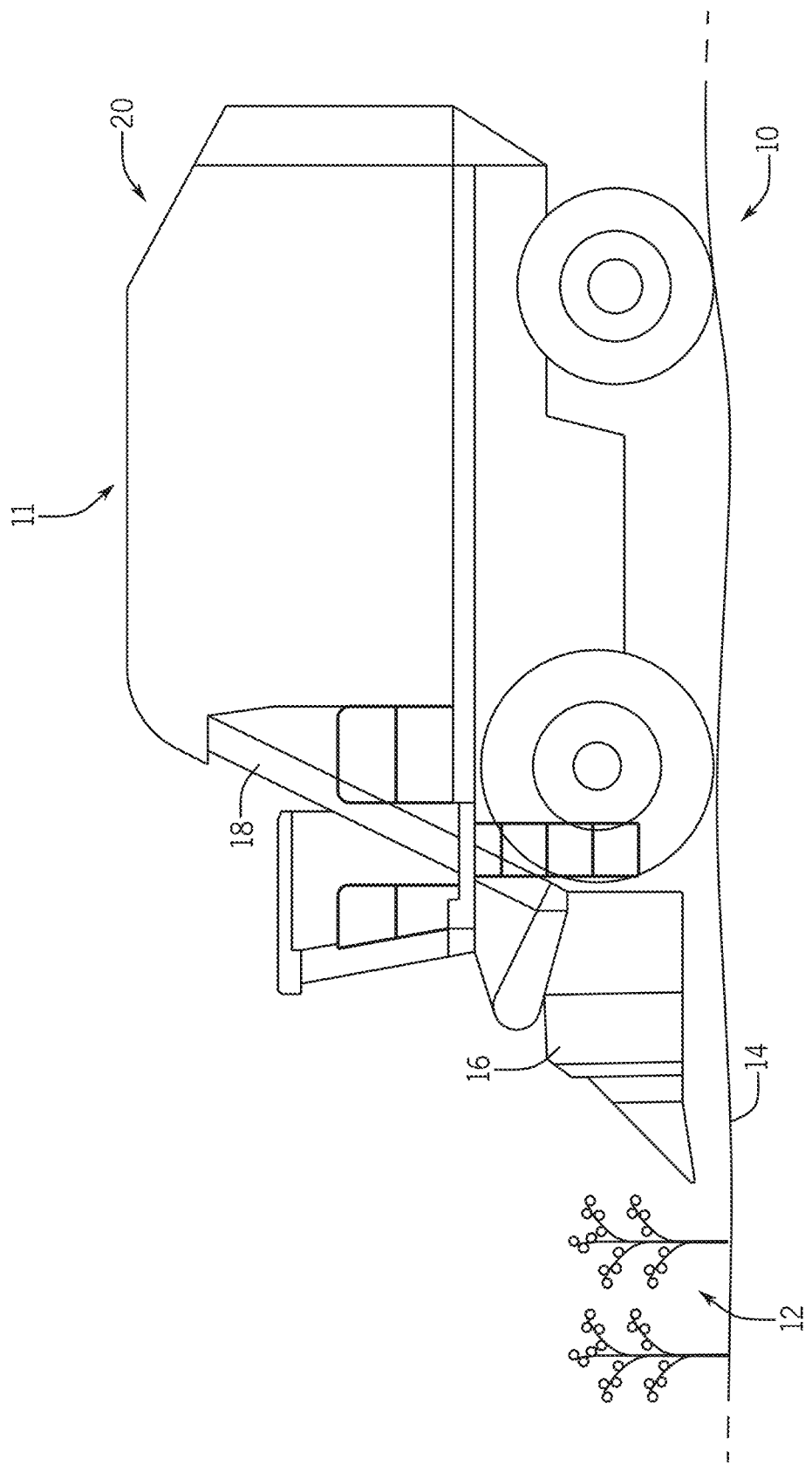
FIG. 1 is a side view of an embodiment of an agricultural system having a bale wrap assembly loading system.

FIG. 1 is a side view of an embodiment of an agricultural system 10 (e.g., harvester, agricultural harvester) having a bale wrap assembly loading system 11. The agricultural system 10 is configured to harvest agricultural product 12 (e.g., cotton) from a field 14 and to form the agricultural product 12 into bales (e.g., agricultural bales). In the illustrated embodiment, the agricultural system 10 includes a header 16 having drums configured to harvest the agricultural product 12 from the field 14. Additionally, the agricultural system 10 includes an air-assisted conveying system 18 configured to move the agricultural product 12 from the drums of the header 16 to an accumulator of the agricultural system 10. The agricultural system 10 also includes a conveying system configured to convey the agricultural product 12 from the accumulator into a baler 20 (e.g., agricultural baler). The baler 20 is supported by and/or mounted within or on a chassis of the agricultural system 10. The baler 20 may form the agricultural product 12 into round bales. However, in other embodiments, the baler 20 of the agricultural system 10 may form the agricultural product into square bales, polygonal bales, or bales of other suitable shape(s). After forming the agricultural product 12 into a bale, a bale wrapping system of the agricultural system 10 wraps the bale with a bale wrap to secure the agricultural product 12 within the bale and to generally maintain a shape of the bale.

A bale wrap assembly provides the bale wrap to the bale wrapping system. The bale wrap assembly includes the bale wrap and a shaft, in which the bale wrap is wrapped around the shaft. As discussed in detail below, multiple bale wraps may be loaded onto the agricultural system 10 via the bale wrap assembly loading system 11. The bale wrap assembly loading system includes a storage compartment configured to store multiple bale wrap assemblies. The storage compartment includes a frame and a bale wrap support rotatably coupled to the frame at a pivot point. The storage compartment also includes a first bale wrap mount coupled to the bale wrap support and a second bale wrap mount coupled to the bale wrap support. The first and second bale wrap mounts are positioned on opposite sides of the pivot point, the first bale wrap mount is configured to support one or more first bale wrap assemblies, and the second bale wrap mount is configured to support one or more second bale wrap assemblies. Furthermore, the bale wrap support is configured to rotate about the pivot point to orient the bale wrap support at a first loading angle to facilitate receiving the one or more first bale wrap assemblies at a loading location and to orient the bale wrap support at a second loading angle to facilitate receiving the one or more second bale wrap assemblies at the loading location. The bale wrap assembly loading system also includes an arm (e.g., movably coupled to the frame of the storage compartment). The arm is configured to move each bale wrap assembly from a surface to the loading location. Accordingly, multiple bale wrap assemblies may be loaded from the surface (e.g., ground surface) to the agricultural system.

By way of example, to load two bale wrap assemblies onto the agricultural system, the bale wrap support may rotate to orient the bale wrap support at the first loading angle. The arm may then move a first bale wrap assembly from the surface to the loading location, and the first bale wrap assembly may be engaged with the first bale wrap mount at the loading location, such that the first bale wrap mount supports the first bale wrap assembly. Next, the bale wrap support may rotate to orient the bale wrap support at the second loading angle. The arm may then move a second bale wrap assembly from the surface to the loading location, and the second bale wrap assembly may be engaged with the second bale wrap mount at the loading location, such that the second bale wrap mount supports the second bale wrap assembly. To facilitate operation of the bale wrapping system, the bale wrap support may rotate to a first working angle, thereby positioning the first bale wrap assembly at a working location suitable for providing the bale wrap of the first bale wrap assembly to the bale wrapping system. After the bale wrap of the first bale wrap assembly is depleted, the bale wrap support may rotate to a second working angle, thereby positioning the second bale wrap assembly at the working location suitable for providing the bale wrap of the second bale wrap assembly to the bale wrapping system.

Figure 2A:
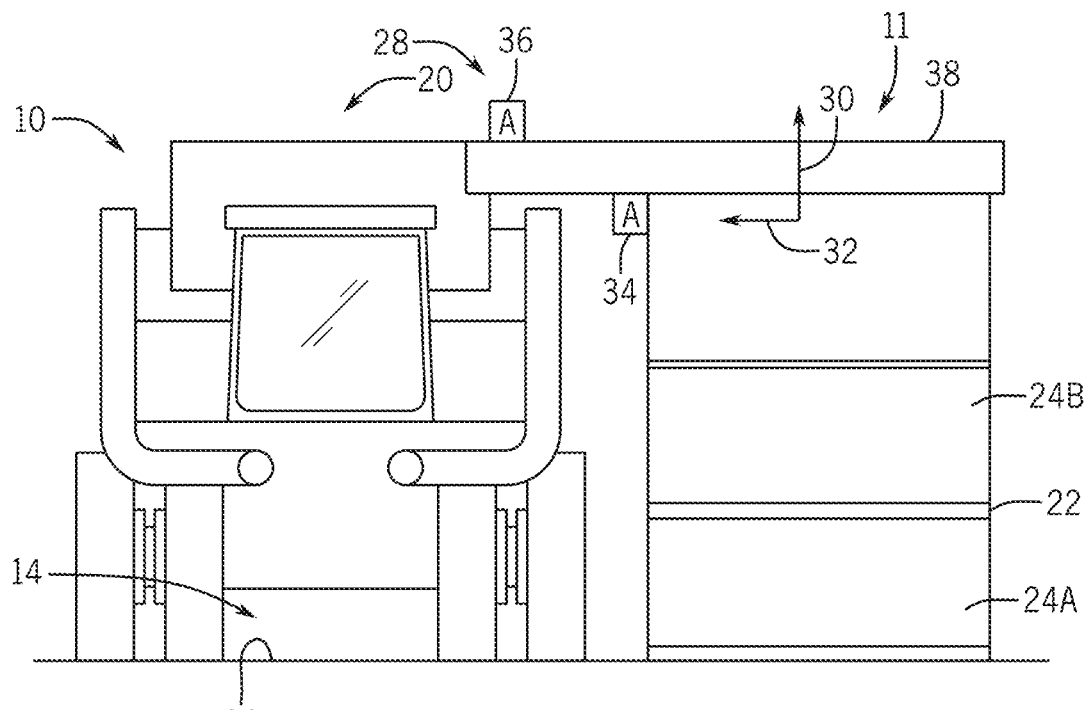
FIG. 2A is a front schematic view of an embodiment of a bale wrap assembly loading system that may be employed within the agricultural system of FIG. 1, in which the bale wrap assembly loading system includes a storage compartment, and the storage compartment is in a loading position.

FIG. 2A is a front schematic view of an embodiment of a bale wrap assembly loading system 11 that may be employed within the agricultural system 10 of FIG. 1. In the illustrated embodiment, the bale wrap assembly loading system 11 includes a storage compartment 22, in which the storage compartment 22 is in a loading position. The storage compartment 22 is configured to store multiple bale wrap assemblies 24. The storage compartment 22 includes a frame and may be partially enclosed (e.g., including one or more walls). For example, in certain embodiments, the storage compartment may include a frame without walls. As previously discussed, each bale wrap assembly 24 includes a bale wrap and a shaft, in which the bale wrap is wrapped around the shaft. In the illustrated embodiment, the storage compartment 22 is configured to store two large bale wrap assemblies 24, including a first bale wrap assembly 24A and a second bale wrap assembly 24B. However, as discussed in detail below, in certain embodiments, the storage compartment may be configured to store more bale wrap assemblies (e.g., 3, 4, 5, 6, 7, 8, 9, 10, or more).

The storage compartment 22 is configured to be positioned proximate to a surface, such as a ground surface 26 of the field 14, while the storage compartment 22 is in the illustrated loading position. As used herein, "proximate" refers to a distance between the storage compartment 22 and a surface (e.g., the ground surface 26) that is less than a threshold distance (e.g., 1 cm, 5 cm, 10 cm, 15 cm, etc.). In the illustrated embodiment, the storage compartment 22 is configured to be positioned on the ground surface 26 while in the loading position. However, in other embodiments, the storage compartment may be configured to be positioned a small distance above the ground surface (e.g., less than 1 cm, less than 5 cm, less than 10 cm, less than 15 cm, etc.) while in the loading position. For example, in certain embodiments, each bale wrap assembly 24 may be positioned on a pallet that is on the ground surface 26. In such embodiments, the storage compartment may be positioned above the ground surface by a distance substantially equal to the height of the pallet while the storage compartment is in the loading position. Furthermore, the storage compartment 22 is configured to be positioned proximate to the baler 20 while in a working position.

As discussed in detail below, the storage compartment 22 includes a bale wrap support rotatably coupled to the frame of the storage compartment 22 at a pivot point. The storage compartment 22 also includes a first bale wrap mount coupled to the bale wrap support and a second bale wrap mount coupled to the bale wrap support. The first and second bale wrap mounts are positioned on opposite sides of the pivot point, the first bale wrap mount is configured to support one or more first bale wrap assemblies, and the second bale wrap mount is configured to support one or more second bale wrap assemblies. Furthermore, the bale wrap support is configured to rotate about the pivot point to orient the bale wrap support at a first loading angle to facilitate receiving the one or more first bale wrap assemblies at a loading location and to orient the bale wrap support at a second loading angle to facilitate receiving the one or more second bale wrap assemblies at the loading location. The bale wrap assembly loading system also includes an arm (e.g., movably coupled to the frame of the storage compartment 22). The arm is configured to move each bale wrap assembly from a surface (e.g., the ground surface 26) to the loading location. Accordingly, multiple bale wrap assemblies may be loaded from the surface (e.g., the ground surface 26) to the storage compartment 22.

By way of example, while the storage compartment 22 is in the illustrated loading position, the bale wrap support may rotate to orient the bale wrap support at the first loading angle. The arm may then move the first bale wrap assembly 24A from the surface (e.g., the ground surface 26) to the loading location, and the first bale wrap assembly 24A may be engaged with the first bale wrap mount at the loading location, such that the first bale wrap mount supports the first bale wrap assembly 24A. Next, the bale wrap support may rotate to orient the bale wrap support at the second loading angle. The arm may then move the second bale wrap assembly 24B from the surface (e.g., the ground surface 26) to the loading location, and the second bale wrap assembly 24B may be engaged with the second bale wrap mount at the loading location, such that the second bale wrap mount supports the second bale wrap assembly. Accordingly, the first bale wrap assembly 24A and the second bale wrap assembly 24B may be disposed within the storage compartment 22.

In the illustrated embodiment, the bale wrap assembly loading system 11 includes an actuation assembly 28 configured to drive the storage compartment 22 to move in an upward direction 30 from the illustrated loading position to an intermediate position. In addition, the actuation assembly 28 is configured to drive the storage compartment 22 to move in a laterally inward direction 32 from the intermediate position to the working position. In the illustrated embodiment, the actuation assembly 28 includes a first actuator 34 (e.g., first storage compartment actuator) and a second actuator 36 (e.g., second storage compartment actuator). The first actuator 34 is configured to drive the storage compartment 22 to move in the upward direction 30, and the second actuator 36 is configured to drive the storage compartment 22 to move in the laterally inward direction 32. Each actuator may include any suitable type(s) of actuating device(s), such as one or more hydraulic cylinders, one or more pneumatic cylinders, one or more electric linear actuators, one or more electric motors, one or more hydraulic motors, one or more pneumatic motors, one or more other suitable actuating devices, or a combination thereof.

In the illustrated embodiment, the storage compartment 22 is movably coupled to a movable support 38, and the movable support 38 is movably coupled to a frame/chassis of the agricultural system 10. The first actuator 34 is configured to drive the storage compartment 22 to move relative to the movable support 38, and the second actuator 36 is configured to move the movable support 38 relative to the frame/chassis of the agricultural system 10. For example, to move the storage compartment 22 from the illustrated loading position to the intermediate position, the first actuator 34 may drive the storage compartment 22 to move in the upward direction 30 relative to the movable support 38. In addition, to move the storage compartment 22 from the intermediate position to the working position, the second actuator 36 may move the movable support 38 in the laterally inward direction 32. The storage compartment 22 may be movably coupled to the movable support 38 by any suitable type(s) of linkage(s), such as a scissor linkage, a track assembly, a cable system, other suitable type(s) of linkage(s), or a combination thereof. Furthermore, the movable support 38 may be movably coupled to the frame/chassis of the agricultural system 10 by any suitable type(s) of linkage(s), such as a scissor linkage, a track assembly, a cable system, other suitable type(s) of linkage(s), or a combination thereof.

Figure 2B:
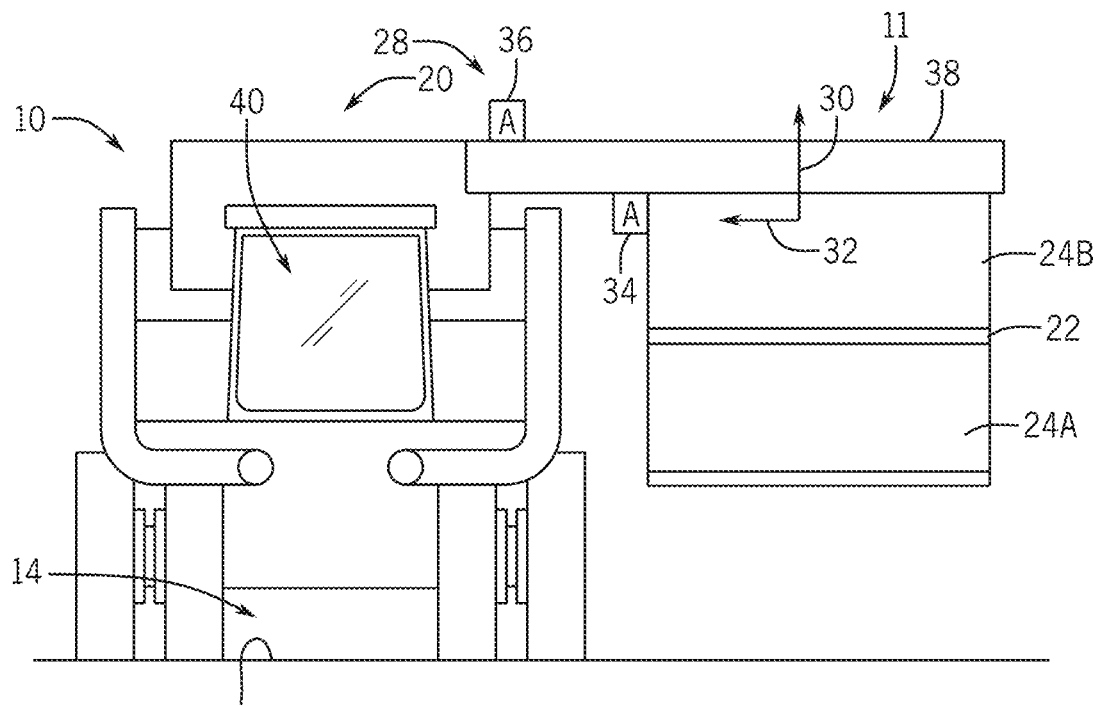
FIG. 2B is a front schematic view of the bale wrap assembly loading system of FIG. 2A, in which the storage compartment is in an intermediate position.

FIG. 2B is a front schematic view of the bale wrap assembly loading system 11 of FIG. 2A, in which the storage compartment 22 is in an intermediate position. After the storage compartment 22 receives the bale wrap assemblies 24, the first actuator 34 may drive the storage compartment 22 to move in the upward direction 30 from the loading position, as shown in FIG. 2A, to the illustrated intermediate position. As a result, the storage compartment 22 is raised above the ground surface 26, and the storage compartment 22 is aligned with a receiving region 40 of the agricultural system 10 along the upward direction 30. Once the storage compartment 22 is in the intermediate position, the second actuator 36 may drive the storage compartment 22 to move in the laterally inward direction 32 from the intermediate position to the working position.

Figure 2C:
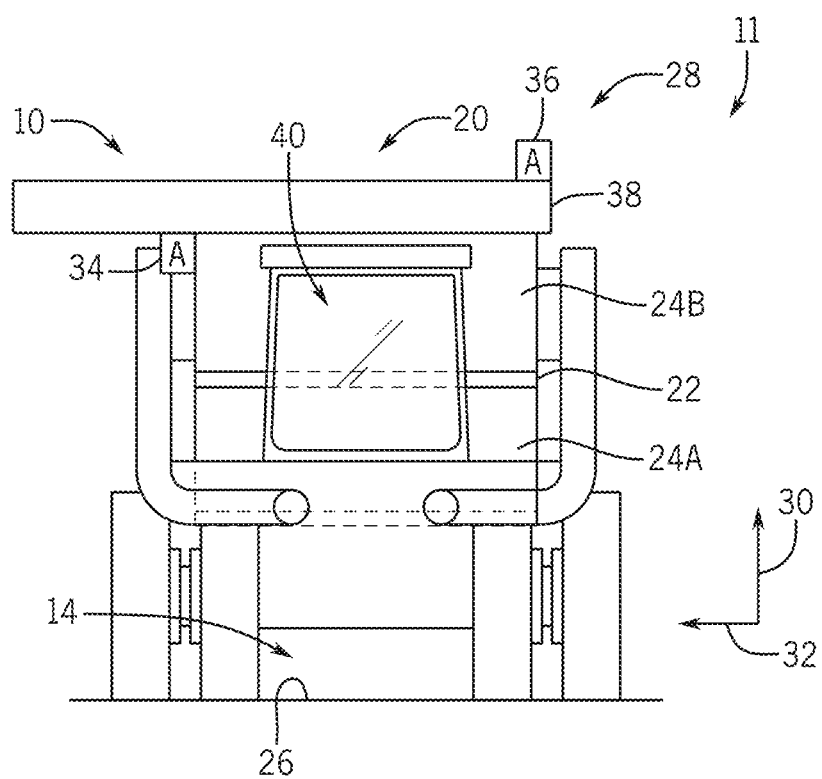
FIG. 2C is a front schematic view of the bale wrap assembly loading system of FIG. 2A, in which the storage compartment is in a working position.

FIG. 2C is a front schematic view of the bale wrap assembly loading system 11 of FIG. 2A, in which the storage compartment 22 is in a working position. Once the storage compartment 22 is in the intermediate position, as shown in FIG. 2B, the second actuator 36 may drive the storage compartment 22 to move in the laterally inward direction 32 from the intermediate position to the illustrated working position. As a result, the storage compartment 22 is disposed within the receiving region 40 of the agricultural system 10, and the storage compartment 22 is positioned proximate to the baler 20.

With the storage compartment 22 in the illustrated working position and the bale wrap support at a first working angle, which positions the first bale wrap assembly 24A at a working location suitable for providing the bale wrap of the first bale wrap assembly 24A to the bale wrapping system, the bale wrap of the first bale wrap assembly 24A may be used to wrap bales of the agricultural product. For example, as discussed in detail below, a feeding mechanism may direct the bale wrap of the first bale wrap assembly 24A toward the bale. The bale wrap may be directed into contact with the bale via a bale wrap applicator, and the bale wrap may be captured between the bale and belt(s) configured to drive the bale to rotate within the baler. Accordingly, rotation of the bale draws the bale wrap around the bale, thereby wrapping the bale. After the bale wrap of the first bale wrap assembly 24A is depleted, the bale wrap of the second bale wrap assembly 24B may be used to wrap bales. For example, the bale wrap support may rotate to a second working angle, thereby positioning the second bale wrap assembly 24B at the working location suitable for providing the bale wrap of the second bale wrap assembly 24B to the bale wrapping system. The feeding mechanism may direct the bale wrap of the second bale wrap assembly 24B toward the bale, the bale wrap may be directed into contact with the bale via the bale wrap applicator, and the bale wrap may be captured between the bale and the belt(s), thereby enabling rotation of the bale to draw the bale wrap around the bale.

In certain embodiments, the second actuator 36 may drive the storage compartment 22 to move in the laterally outward direction to the intermediate position, as shown in FIG. 2B, before the bale wrap support rotates from the first working angle to the second working angle, thereby providing sufficient clearance for the bale wrap support to rotate. In such embodiments, the second actuator 36 may drive the storage compartment 22 to move in the laterally inward direction to the working position after the rotation. Furthermore, in certain embodiments, the agricultural system 10 may be configured to provide sufficient clearance for the bale wrap support to rotate while the storage compartment 22 is in the illustrated working position. In such embodiments, the bale wrap support may rotate without moving the storage compartment 22.

After the bale wraps of the bale wrap assemblies 24 are depleted, the shafts of the bale wrap assemblies may be removed from the storage compartment 22 (e.g., if each shaft is not automatically removed after the respective bale wrap is depleted). Additional bale wrap assemblies may then be disposed within the storage compartment 22. For example, to load additional bale wrap assemblies 24 within the storage compartment 22, the second actuator 36 may drive the movable support 38 to move laterally outwardly from the illustrated working position to the intermediate position. The first actuator 34 may then drive the storage compartment 22 to move downwardly from the intermediate position to the loading position. Once in the loading position, additional bale wrap assemblies may be loaded into the storage compartment.

While the bale wrap assembly 11 includes an actuation assembly 28 having two actuators in the illustrated embodiment, in other embodiments, the actuation assembly may include more or fewer actuators. For example, in certain embodiments, one of the first actuator or the second actuator may be omitted. In such embodiments, the moveable storage compartment may be driven to move in the direction corresponding to the omitted actuator by an operator (e.g., manually, via a crank, via a lever, etc.). Furthermore, in certain embodiments, the actuation assembly may be omitted, and the storage compartment may be driven to move in the upward direction and the laterally inward direction by the operator (e.g., manually, via crank(s), via lever(s), etc.).

Figure 3A:
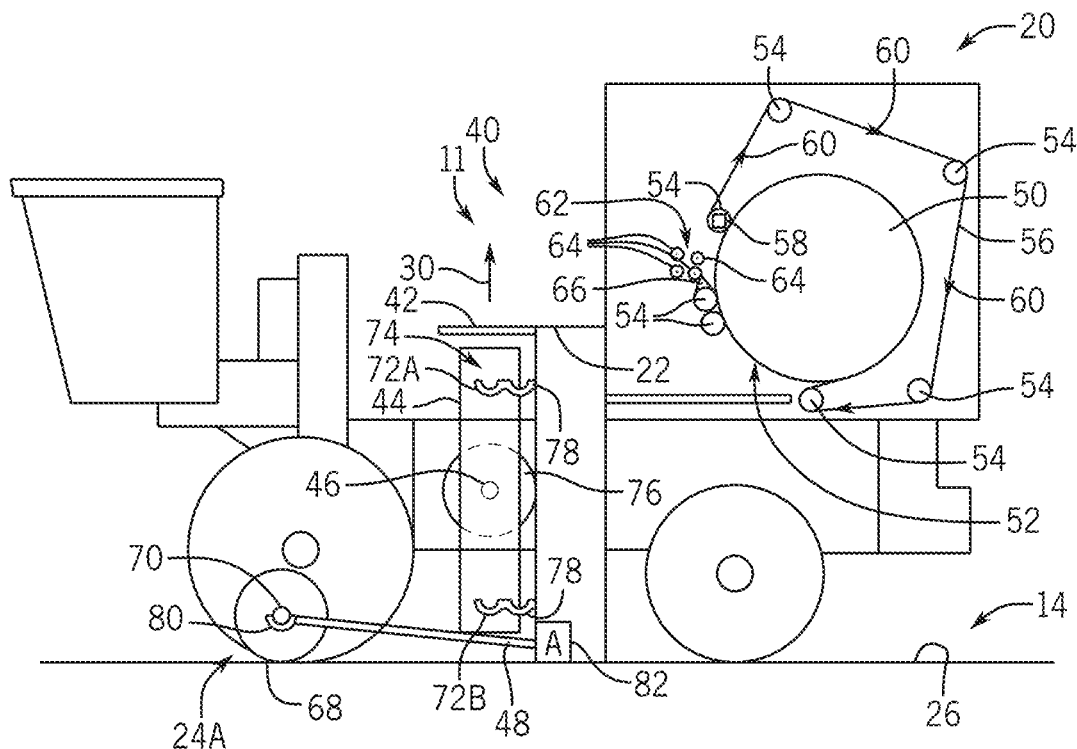
FIG. 3A is a side schematic view of the bale wrap assembly loading system of FIG. 2A, in which the bale wrap assembly loading system includes a bale wrap support and an arm, the storage compartment is in the loading position, the bale wrap support is at a first loading angle, and the arm is in an engagement position.

FIG. 3A is a side schematic view of the bale wrap assembly loading system 11 of FIG. 2A. In the illustrated embodiment, the storage compartment 22 of the bale wrap assembly loading system 11 includes a frame 42 and a bale wrap support 44 rotatably coupled to the frame 42 at a pivot point 46. In addition, the bale wrap assembly loading system 11 includes an arm 48 movably coupled to the frame 42 of the storage compartment 22. As illustrated, the storage compartment 22 is in the loading position, the bale wrap support 44 is at a first loading angle, and the arm 48 is in an engagement position. As discussed in detail below, the bale wrap support 44 is configured to rotate about the pivot point 46 to orient the bale wrap support at the first loading angle to facilitate receiving the first bale wrap assembly 24A at a loading location and to orient the bale wrap support 44 at a second loading angle to facilitate receiving the second bale wrap assembly at the loading location. In addition, the arm 48 is configured to move each bale wrap assembly 24 from the ground surface 26 to the loading location, thereby facilitating loading each bale wrap assembly 24 into the storage compartment 22.

As previously discussed with regard to FIG. 1, the agricultural system includes a baler 20 configured to form a bale 50 of the agricultural product. As the agricultural product (e.g., cotton) is harvested, the agricultural product flows into an accumulator (e.g., bale chamber) and/or a feeding system. For example, the agricultural product may be blown by the air-assisted conveying system into the accumulator/bale chamber. The agricultural product is then fed into a cavity 52 of the baler 20 by a conveying system. The baler 20 includes multiple rollers 54 that support and/or drive rotation of one or more belts 56. For example, one or more rollers 54 engage the belt(s) 56, which enable the belt(s) 56 to move along the pathway defined by the rollers 54 and the bale 50. One or more rollers are driven to rotate via a belt drive system 58 (e.g., including electric motor(s), hydraulic motor(s), pneumatic motor(s), etc.). The belt(s) 56 circulate around the path defined by the rollers 54 and the bale 50, as indicated by arrows 60. Movement of the belt(s) 56 captures the agricultural product from the accumulator and draws the agricultural product into the cavity 52, where the agricultural product is gradually built up to form the bale 50. As the agricultural product builds within the cavity 52, one or more of the rollers 54 may move radially outward to accommodate the increasing size of the bale 50.

Once the bale 50 reaches a desired size, a bale wrapping system 62 wraps the bale 50 with a bale wrap from a respective bale wrap assembly 24. The bale wrap may include cotton, hemp, flax, plastic, bioplastic, fabric, canvas, cloth, other suitable material(s) (e.g., biodegradable material(s), natural material(s)), or a combination thereof. In certain embodiments, the bale wrap may include only cotton.

The bale wrap is fed into contact with the bale 50 with one or more feed rollers 64 and over a wrap guide or wrap applicator 66 (e.g., duckbill). The wrap guide/wrap applicator 66 is configured to move (e.g., rotate) to direct the bale wrap into contact with the bale 50. The bale wrap is captured between the bale 50 and the belt(s) 56. Accordingly, rotation of the bale 50 draws the bale wrap around the bale 50, thereby wrapping the bale 50.

As previously discussed, each bale wrap assembly 24 includes a bale wrap 68 and a shaft 70, in which the bale wrap 68 is wrapped around the shaft 70. In the illustrated embodiment, the storage compartment 22 includes a first bale wrap mount 72A coupled to the bale wrap support 44, and the first bale wrap mount 72A is configured to support the first bale wrap assembly 24A (e.g., via the shaft 70 of the first bale wrap assembly 24A). In addition, the storage compartment 22 includes a second bale wrap mount 72B coupled to the bale wrap support 44 and configured to support a second bale wrap assembly (e.g., via the shaft 70 of the second bale wrap assembly). As illustrated, the first and second bale wrap mounts are positioned on opposite sides of the pivot point 46. The bale wrap support 44 is configured to rotate about the pivot point 46 to orient the bale wrap support 44 at the first loading angle, as illustrated, to facilitate receiving the first bale wrap assembly 24A at the loading location 74. The bale wrap support 44 is also configured to rotate about the pivot point 46 to orient the bale wrap support 44 at a second loading angle to facilitate receiving the second bale wrap assembly at the loading location 74. Furthermore, as discussed in detail below, the arm 48, which is movably coupled to the frame 42 of the storage compartment 22, is configured to move each bale wrap assembly 24 from the ground surface 26 to the loading location, thereby facilitating loading each bale wrap assembly 24 into the storage compartment 22.

In the illustrated embodiment, the storage compartment 22 includes a bale wrap support actuator 76 configured to drive the bale wrap support 44 to rotate (e.g., between the illustrated first loading angle and the second loading angle). The bale wrap support actuator 76 may include any suitable type(s) of actuating device(s), such as one or more hydraulic cylinders, one or more pneumatic cylinders, one or more electric linear actuators, one or more electric motors, one or more hydraulic motors, one or more pneumatic motors, one or more other suitable actuating devices, or a combination thereof. Furthermore, in certain embodiments, the bale wrap support actuator may be omitted, and the bale wrap support may be manually rotated (e.g., between the illustrated first loading angle and the second loading angle).

In the illustrated embodiment, the bale wrap support 44 includes a first plate and a second plate rigidly coupled to one another via cross-member(s). The first plate is positioned on a first lateral side of the storage compartment 22, and the second plate is positioned on a second lateral side of the storage compartment 22, opposite the first side. Accordingly, the first and second plates are configured to be positioned laterally outward from the bale wrap assemblies 24 while the bale wrap assemblies 24 are engaged with the bale wrap mounts 72. The cross-member(s) extend laterally across the storage compartment 22 between the first and second plates, and the cross-member(s) are positioned to facilitate movement of each bale wrap assembly 24 from the ground surface to the loading location. While the bale wrap support 44 is formed from two plates and cross-member(s) in the illustrated embodiment, in other embodiments, the bale wrap support may be formed from any other suitable component(s) (e.g., alone or in combination with the plates and the cross-member(s)), such as a framework, bar(s), rod(s), tube(s), other suitable component(s), or a combination thereof.

In the illustrated embodiment, each bale wrap mount 72 includes a respective set of hooks, and each set of hooks is configured to engage the shaft 70 of a respective bale wrap assembly 24, thereby supporting the bale wrap assembly 24 on the bale wrap support 44. For each set of hooks, a hook may be coupled to each plate of the bale wrap support 44, such that the hook extends laterally inwardly from the respective plate. As a result, the hooks of each set engage both lateral ends of the shaft 70 of the respective bale wrap assembly 24, thereby supporting the respective bale wrap assembly 24 within the storage compartment 22. While each bale wrap mount 72 includes a set of hooks in the illustrated embodiment, in other embodiments, at least one bale wrap mount may include other suitable device(s) (e.g., alone or in combination with the set of hooks) to support the respective bale wrap assembly, such as cradle(s), axle(s), etc.

In the illustrated embodiment, each bale wrap mount 72 includes a respective locking mechanism 78. In certain embodiments, each locking mechanism 78 is configured to cooperate with a respective set of hooks to secure a bale wrap assembly 24 to the bale wrap support 44. In certain embodiments, each locking mechanism 78 includes latches, each rotatably coupled to a respective hook. Once the shaft 70 of a bale wrap assembly 24 is engaged with a hook, the latch of the respective locking mechanism 78 may be rotated to an engagement position, thereby capturing the shaft 70. In certain embodiments, the latches may be manually actuated by an operator after the shaft of the bale wrap assembly is engaged with the hooks. Furthermore, in certain embodiments, at least one locking mechanism 78 (e.g., each locking mechanism 78) is configured to automatically engage the shaft 70 of the bale wrap assembly 24 in response to the shaft engaging the respective set of hooks. For example, in embodiments in which the locking mechanism includes latches, the locking mechanism may also include levers configured to drive the latches to rotate to engage the shaft in response to the shaft contacting the levers. Furthermore, in certain embodiments, at least one locking mechanism (e.g., each locking mechanism) may include a sensor configured to detect engagement of the shaft with the set of hooks. The locking mechanism may also include actuator(s) configured to drive the locking mechanism to engage in response to detection of the shaft engaged with the set of hooks. While a locking mechanism having latches is disclosed above, in certain embodiments, the locking mechanism may include other suitable locking device(s) (e.g., alone or in combination with the latches) configured to engage the shaft to secure the shaft to the set of hooks, such as pin(s) configured to engage aperture(s) of the shaft, electromagnet(s) configured to selectively activate to secure the shaft to the set of hooks, etc. Furthermore, while locking mechanisms configured to cooperate with hooks are disclosed above, in embodiments in which at least one bale wrap mount includes other suitable device(s) to support the respective bale wrap assembly, at least one locking mechanism may be configured to cooperate with the other device(s). While each bale wrap mount 72 includes a respective locking mechanism 78 in the illustrated embodiment, in other embodiments, at least one bale wrap mount may not include a respective locking mechanism. For example, in certain embodiments, the locking mechanisms may be omitted.

In the illustrated embodiment, the arm 48 includes at least one hook 80 configured to engage the shaft 70 of a bale wrap assembly 24 to support the bale wrap assembly 24. For example, in certain embodiments, the arm 48 includes a set of hooks 80, in which the set of hooks 80 includes one or more hooks 80 positioned on each lateral side of the arm 48 to engage each lateral end of the shaft 70 of the bale wrap assembly 24, thereby supporting the bale wrap assembly 24 on the arm 48. In certain embodiments, the arm includes a locking mechanism. The locking mechanism is configured to cooperate with the hook(s) to secure a bale wrap assembly to the arm. As disclosed above with reference to the storage compartment locking mechanisms, the locking mechanism may be manually or automatically actuated, and the locking mechanism may include any suitable locking device(s). Furthermore, in certain embodiments, the arm may not include a locking mechanism. In addition, in the illustrated embodiment, the hook(s) 80 face upwardly while the arm 48 is in the engagement position. However, in other embodiments, the hook(s) may face downwardly while the arm is in the engagement position to engage the top of the shaft, and the locking mechanism may engage the bottom of the shaft to couple the bale wrap assembly to the arm. While the arm 48 includes hook(s) 80 in the illustrated embodiment, in other embodiments, the arm may include other suitable device(s) (e.g., alone or in combination with the hook(s)) to support the bale wrap assembly, such as cradle(s), axle(s), etc. In such embodiments, if the arm includes a locking mechanism, the locking mechanism may be configured to cooperate with the other device(s).

In the illustrated embodiment, the bale wrap assembly loading system 11 includes an arm actuator (e.g., actuator) 82 configured to drive the arm 48 to rotate from the illustrated engagement position to a transfer position. The arm actuator 82 may include any suitable type(s) of actuating device(s), such as one or more hydraulic cylinders, one or more pneumatic cylinders, one or more electric linear actuators, one or more electric motors, one or more hydraulic motors, one or more pneumatic motors, one or more other suitable actuating devices, or a combination thereof. The arm 48 is configured to engage a bale wrap assembly 24 while the bale wrap assembly 24 is on the ground surface 26 and the arm 48 is in the illustrated engagement position. In addition, the arm 48 is configured to disengage the bale wrap assembly 24 while the arm is in the transfer position and the bale wrap assembly 24 is at the loading location 74. Accordingly, the arm 48 is configured to move each bale wrap assembly 24 from the ground surface 26 to a respective bale wrap mount 72 while the storage compartment 22 is in the illustrated loading position. While the arm is configured to rotate between the illustrated engagement position and the transfer position in the illustrated embodiment, in other embodiments, the arm may be configured to translate or translate/rotate between the engagement position and the loading position. Furthermore, while the arm 48 is movably coupled to the frame 42 of the storage compartment 22 in the illustrated embodiment, in other embodiments, the arm may be movably coupled to another suitable structure of the agricultural system, such as the frame/chassis of the agricultural system. As used herein, "on the surface" (e.g., "on the ground surface") and "from the surface" (e.g., "from the ground surface") refer to a location of a bale wrap assembly that is directly on the surface (e.g., ground surface) or indirectly on the surface (e.g., ground surface), such as the bale wrap assembly being positioned on a mat or pallet that is directly on the surface (e.g., ground surface).

In certain embodiments, the bale wrap assembly loading system may include a second arm actuator (e.g., actuator) configured to adjust a length of the arm. For example, the length of the arm may be controlled to facilitate engaging the bale wrap assembly on the ground surface. In addition, the length of the arm may be controlled to position the bale wrap assembly at the loading location. The second arm actuator may include any suitable type(s) of actuating device(s), such as one or more hydraulic cylinders, one or more pneumatic cylinders, one or more electric linear actuators, one or more electric motors, one or more hydraulic motors, one or more pneumatic motors, one or more other suitable actuating devices, or a combination thereof. In certain embodiments, the second arm actuator may be omitted, and the length of the arm may be fixed or adjusted manually (e.g., via a pin/aperture assembly, via a screw drive assembly, etc.).

To load two bale wrap assemblies 24 into the storage compartment 22, while the storage compartment 22 is in the illustrated loading position, the bale wrap support 44 may rotate (e.g., via the bale wrap support actuator 76) to orient the bale wrap support 44 at the illustrated first loading angle. The arm 48 may then move (e.g., via the arm actuator 82) the first bale wrap assembly 24A from the ground surface 26 to the loading location 74, and the first bale wrap assembly 24A may engage the first bale wrap mount 72A at the loading location 74, such that the first bale wrap mount 72A supports the first bale wrap assembly 24A. Next, the bale wrap support 44 may rotate (e.g., via the bale wrap support actuator 76) to orient the bale wrap support 44 at the second loading angle. The arm 48 may then move (e.g., via the arm actuator 82) a second bale wrap assembly from the ground surface 26 to the loading location 74, and the second bale wrap assembly may engage the second bale wrap mount 72B at the loading location 74, such that the second bale wrap mount 72B supports the second bale wrap assembly.

Figure 3B:
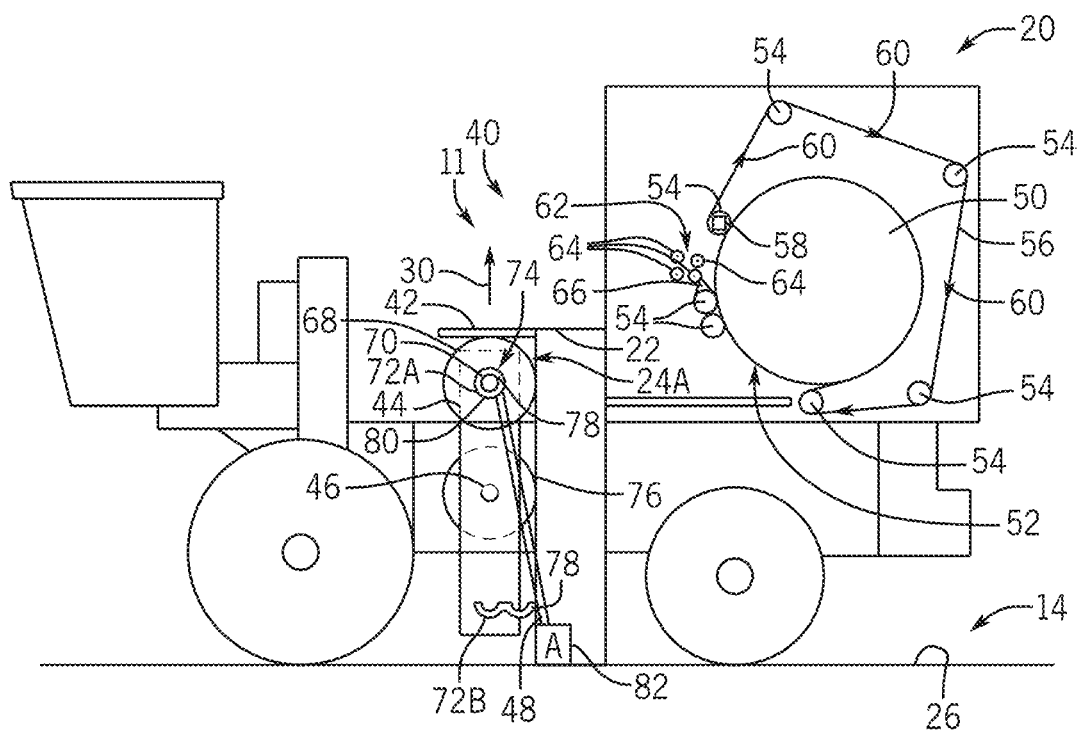
FIG. 3B is a side schematic view of the bale wrap assembly loading system of FIG. 2A, in which the storage compartment is in the loading position, the bale wrap support is at the first loading angle, and the arm is in a transfer position.

FIG. 3B is a side schematic view of the bale wrap assembly loading system 11 of FIG. 2A, in which the storage compartment 22 is in the loading position, the bale wrap support 44 is at the first loading angle, and the arm 48 is in the transfer position. In the illustrated embodiment, with the bale wrap support 44 oriented at the first loading angle, the first bale wrap mount 72A is positioned at the loading location 74. In addition, with the arm 48 in the illustrated transfer position, the first bale wrap assembly 24A is also positioned at the loading location 74. Accordingly, the shaft 70 of the first bale wrap assembly 24A engages the set of hooks of the first bale wrap mount 72A, such that the first bale wrap mount 72A supports the first bale wrap assembly 24A. The respective locking mechanism 78 is engaged with the shaft 70 of the first bale wrap assembly 24A (e.g., in response to manual or automatic actuation), thereby securing the first bale wrap assembly 24A to the bale wrap support 44. In embodiments in which the arm 48 includes a locking mechanism, the locking mechanism may be disengaged to release the shaft 70 of the first bale wrap assembly 24A from the arm 48. The arm actuator 82 may then rotate the arm 48 from the illustrated transfer position to the loading position to facilitate moving another bale wrap assembly from the ground surface into the storage compartment. In addition, the bale wrap support actuator 76 may rotate the bale wrap support 44 from the illustrated first loading angle to the second loading angle.

Figure 3C:
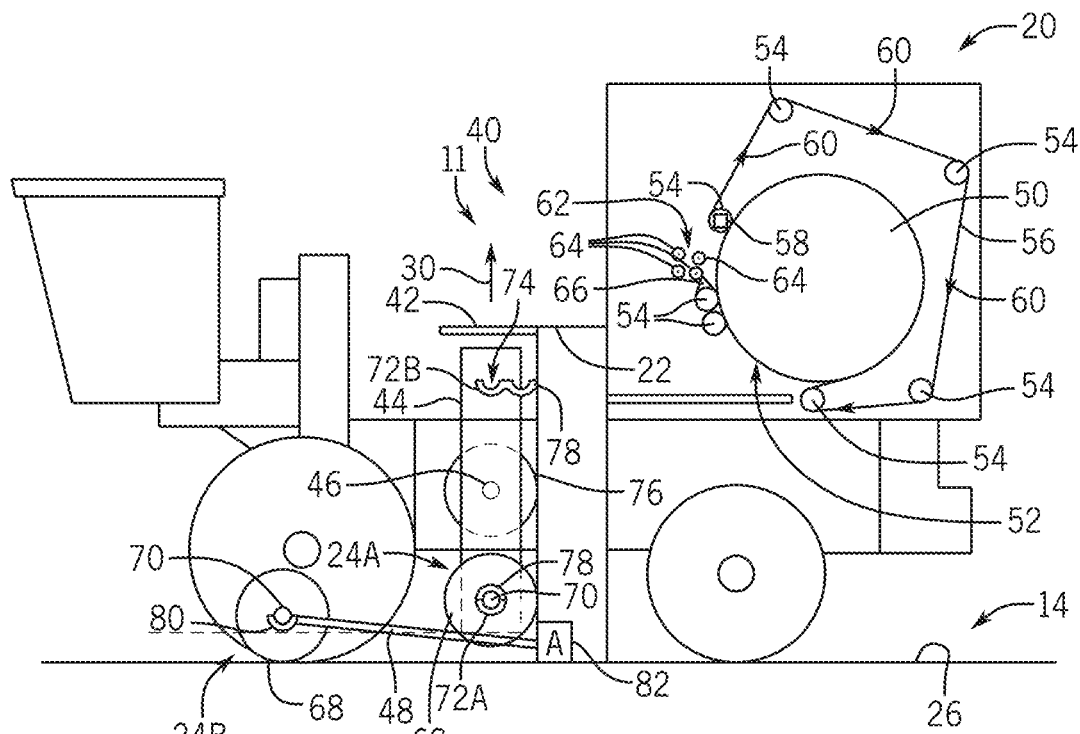
FIG. 3C is a side schematic view of the bale wrap assembly loading system of FIG. 2A, in which the storage compartment is in the loading position, the bale wrap support is at a second loading angle, and the arm is in the engagement position.

FIG. 3C is a side schematic view of the bale wrap assembly loading system 11 of FIG. 2A, in which the storage compartment 22 is in the loading position, the bale wrap support 44 is at the second loading angle, and the arm 48 is in the engagement position. To move the second bale wrap assembly 24B to engage the second bale wrap mount 72B while the storage compartment 22 is in the illustrated loading position, the agricultural system 10 may be moved to a position that aligns the hook(s) 80 of the arm 48 with the shaft 70 of the second bale wrap assembly 24B. The arm actuator 82 may then drive the arm 48 to rotate to the engagement position, thereby engaging the hook(s) 80 of the arm 48 with the shaft 70 of the second bale wrap assembly 24B. In embodiments in which the arm 48 includes a locking mechanism, the locking mechanism may be engaged (e.g., manually or automatically) to secure the shaft 70 of the second bale wrap assembly 24B to the arm 48. The arm actuator 82 may then drive the arm 48 to rotate from the engagement position to the transfer position. With the arm 48 in the transfer position, the shaft 70 of the second bale wrap assembly 24B engages the second bale wrap mount 72B, such that the second bale wrap mount 72B supports the second bale wrap assembly 24B.

Figure 3D:
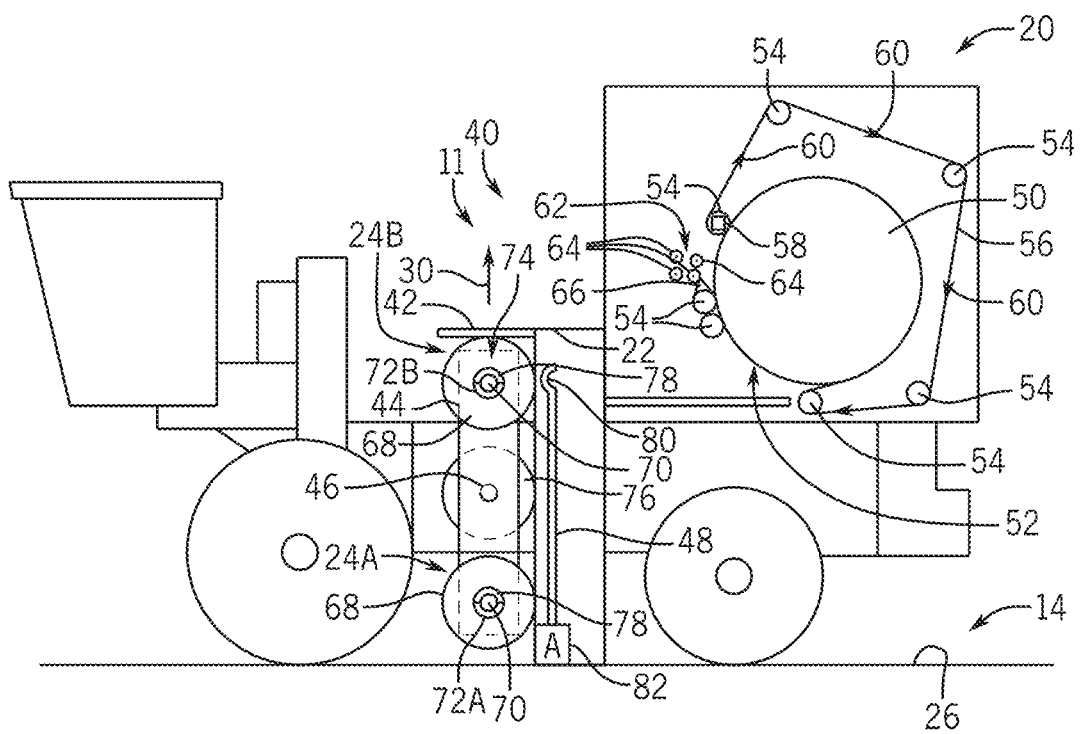
FIG. 3D is a side schematic view of the bale wrap assembly loading system of FIG. 2A, in which the storage compartment is in the loading position, the bale wrap support is at the second loading angle, and the arm is in a storage position.

FIG. 3D is a side schematic view of the bale wrap assembly loading system 11 of FIG. 2A, in which the storage compartment 22 is in the loading position, the bale wrap support 44 is at the second loading angle, and the arm 48 is in a storage position. After the shaft 70 of the second bale wrap assembly 24B engages the set of hooks of the second bale wrap mount 72B, the respective locking mechanism 78 is engaged with the shaft 70 of the second bale wrap assembly 24B (e.g., in response to manual or automatic actuation), thereby securing the second bale wrap assembly 24B to the bale wrap support 44. In embodiments in which the arm 48 includes a locking mechanism, the locking mechanism may be disengaged to release the shaft 70 of the second bale wrap assembly 24B from the arm 48. The arm actuator 82 may then rotate the arm 48 from the transfer position to the illustrated storage position.

In the illustrated embodiment, the arm 48 has a fixed (e.g., constant) length. Accordingly, the arm 48 may rotate from the engagement position, in which the arm 48 engages a bale wrap assembly 24 on the ground surface 26, to the transfer position, in which the arm 48 positions the bale wrap assembly 24 at the loading location. Because the bale wrap support 44 rotates about the pivot point 46, the bale wrap support 44 positions each bale wrap mount 72 at the loading location, thereby enabling the bale wrap mount 72 to receive the bale wrap assembly 24 as the arm reaches the transfer position. However, in certain embodiments, the length of the arm may be adjustable/controllable to facilitate engagement with the bale wrap assembly on the ground surface and/or positioning the bale wrap assembly at the loading location.

To facilitate operation of the bale wrapping system 62, the actuator assembly may drive the storage compartment 22 in the upward direction and in the laterally inward direction from the illustrated loading position to the working position. In addition, the bale wrap support 44 may rotate (e.g., via the bale wrap support actuator 76) to a first working angle, thereby positioning the first bale wrap assembly 24A at a working location suitable for providing the bale wrap 68 of the first bale wrap assembly 24A to the bale wrapping system 62. As previously discussed, the bale wrapping system 62 wraps the bale 50 with the bale wrap 68 of the first bale wrap assembly 24A. The bale wrap 68 is fed toward the bale 50 with the feed roller(s) 64 and over the wrap guide/wrap applicator 66 (e.g., duckbill). The wrap guide/wrap applicator 66 is configured to move (e.g., rotate) to direct the bale wrap 68 into contact with the bale 50. The bale wrap 68 is captured between the bale 50 and the belt(s) 56. Accordingly, rotation of the bale 50 draws the bale wrap 68 around the bale 50, thereby wrapping the bale 50. After the bale wrap 68 of the first bale wrap assembly 24A is depleted, the bale wrap support 44 may rotate (e.g., via the bale wrap support actuator 76) to a second working angle, thereby positioning the second bale wrap assembly 24B at the working location suitable for providing the bale wrap 68 of the second bale wrap assembly 24B to the bale wrapping system 62.

As previously discussed, in certain embodiments, the actuator assembly may move the storage compartment 22 to the intermediate position before the bale wrap support 44 rotates from the first working angle to the second working angle, thereby providing sufficient clearance for the bale wrap support to rotate. In such embodiments, the actuator assembly may move the storage compartment 22 in the laterally inward direction to the working position after the rotation. Furthermore, in certain embodiments, the agricultural system may be configured to provide sufficient clearance for the bale wrap support to rotate while the storage compartment 22 is in the working position. In such embodiments, the bale wrap support 44 may rotate without moving the storage compartment 22.

In the illustrated embodiment, the first working angle of the bale wrap support 44 corresponds to the second loading angle of the bale wrap support 44. Accordingly, the bale wrap support 44 may not rotate between the process of loading the second bale wrap assembly 24B and providing the bale wrap 68 of the first bale wrap assembly 24A to the bale wrapping system 62. In addition, the second working angle of the bale wrap support 44 corresponds to the first loading angle of the bale wrap support. However, in other embodiments, the first working angle may be different than the second loading angle, and/or the second working angle may be different than the first loading angle.

The bale wrap assembly loading system 11 enables multiple bale wrap assemblies 24 to be loaded from the ground surface 26 to the agricultural system without an operator manually lifting any of the bale wrap assemblies 24. Accordingly, large bale wrap assemblies having weights greater than a single operator may manually lift may be readily loaded onto the agricultural system. As a result, the process of organizing multiple operators to load multiple bale wrap assemblies onto the agricultural system may be obviated, which may significantly reduce the duration associated with the bale wrap assembly loading process.

In certain embodiments, the arm 48 may be used to remove the shafts 70 after the bale wraps 68 of the bale wrap assemblies 24 are depleted. For example, with the bale wrap support 44 oriented at the first loading angle, the shaft 70 of the first bale wrap assembly 24A is positioned at the loading location 74. Accordingly, the arm actuator 82 may rotate the arm 48 to the transfer position, thereby enabling the arm 48 to engage the shaft 70 of the first bale wrap assembly 24A. The arm actuator 82 may then rotate the arm 48 to the engagement position, thereby facilitating removal of the shaft 70 from the arm 48. Next, the bale wrap support actuator 76 may rotate the bale wrap support 44 to the second loading angle, which positions the shaft 70 of the second bale wrap assembly 24B at the loading location 74. Accordingly, the arm actuator 82 may rotate the arm 48 to the transfer position, thereby enabling the arm 48 to engage the shaft 70 of the second bale wrap assembly 24B. The arm actuator 82 may then rotate the arm 48 to the engagement position, thereby facilitating removal of the shaft 70 from the arm 48.

In certain embodiments, the storage compartment actuators, the bale wrap support actuator, and the arm actuator(s) may be controlled by the operator using one or more controls (e.g., hand control(s), etc.). For example, in certain embodiments, the control(s) may be disposed on a remote, thereby enabling the operator to control the actuators from a position adjacent to the agricultural system. Furthermore, in certain embodiments, the control(s) may be disposed within the cab of the agricultural system, and one or more cameras may be directed toward the bale wrap assembly loading system. The camera(s) may output images to one or more screens within the cab, thereby enabling the operator to control the actuators from the cab.

While the bale wrap assembly loading system 11 includes the arm 48 in the illustrated embodiment, in certain embodiments, the arm may be omitted. In such embodiments, operator(s) may manually load the bale wrap assemblies onto the bale wrap mounts. Additionally or alternatively, operator(s) may use separate equipment (e.g., crane, forklift, etc.) to load the bale wrap assemblies onto the bale wrap mounts.

Furthermore, in certain embodiments, the bale wrap assemblies 24 may be delivered to the ground surface 26 of the field 14 (e.g., prior to initiation of the baling process).

The locations of the bale wrap assemblies 24 may be output to a controller of the agricultural system, and the controller may instruct a user interface to present information indicative of the bale wrap assembly locations to the operator. For example, the user interface may display an arrow indicating the direction toward each bale wrap assembly, thereby enabling the operator to position the agricultural system for receiving the bale wrap assemblies.

In addition, while loading bale wrap assemblies from the ground surface is disclosed above, in certain embodiments, one or more bale wrap assemblies may be loaded from other suitable surface(s) (e.g., alone or in combination with the ground surface). For example, in certain embodiments, at least one bale wrap assembly may be loaded from the surface (e.g., bed, trailer, etc.) of a transport vehicle (e.g., truck, tractor, etc.). In such embodiments, the storage compartment is configured to be positioned proximate to the surface while in the loading position.

While two bale wrap mounts 72 are coupled to the bale wrap support 44 in the illustrated embodiment, in other embodiments, additional bale wrap mounts may be coupled to the bale wrap support (e.g., such that 3, 4, 5, 6, or more bale wrap mounts are coupled to the bale wrap support). For example, in embodiments in which three bale wrap mounts are coupled to the bale wrap support, the bale wrap support may have a triangular shape, and in embodiments in which four bale wrap mounts are coupled to the bale wrap support, the bale wrap support may have a square shape. Furthermore, the bale wrap support may be configured to rotate to a number of loading angles equal to the number of bale wrap mounts, and the bale wrap support may be configured to rotate to a number of working angles equal to the number of bale wrap mounts.

While the storage compartment 22 is movable between the illustrated loading position and the working position in the illustrated embodiment, in other embodiments, the storage compartment may be fixed in the working position (e.g., not movable). In such embodiments, the arm may move each bale wrap assembly from the surface (e.g., ground surface) to the loading location, which is positioned proximate to the baler. For example, the arm may have a greater length than the illustrated arm to facilitate moving each bale wrap assembly to the loading location. Furthermore, in certain embodiments, the storage compartment may be movable between the working position and the intermediate position to facilitate rotation of the bale wrap support.

While using the bale wrap of the first bale wrap assembly before the bale wrap of the second bale wrap assembly is disclosed above, the bale wraps of the bale wrap assemblies may be used in any suitable order. The order may be stored within the controller of the agricultural system and/or the order may be controlled via the user interface. For example, in certain embodiments, the storage compartment may store bale wrap assemblies having different types of bale wraps. In such embodiments, the operator (e.g., via manual input to the user interface) and/or the controller (e.g., via an automatic operation) may select a particular bale wrap assembly (e.g., after the bale wrap of the previous bale wrap assembly is depleted). The controller may control the bale wrap support actuator to position the selected bale wrap assembly at the working location, thereby enabling the bale wrap of the selected bale wrap assembly to be provided to the bale wrapping system.

Furthermore, in certain embodiments, to facilitate selection of the order, the type of bale wrap for each bale wrap assembly may be stored within the controller and, in certain embodiments, presented to the operator. For example, in certain embodiments, during the bale wrap assembly loading process, the operator may input the type of bale wrap for each bale wrap assembly loaded into the storage compartment (e.g., during the process of loading the bale wrap assembly into the storage compartment). Additionally or alternatively, the controller may determine the type of bale wrap for each bale wrap assembly as the bale wrap assembly is being loaded into the storage compartment (e.g., via a bar code reader configured to read a bar code on the bale wrap assembly, via a quick response (QR) code reader configured to read a QR code on the bale wrap assembly, via a radio frequency identification (RFID) reader configured to read an RFID tag on the bale wrap assembly, etc.). The controller may select the order based on the types of bale wraps of the bale wrap assemblies, and/or the controller may control the user interface to present the types of the bale wraps of the bale wrap assemblies to the operator, thereby enabling the operator to select the order.

In certain embodiments, the controller may store the initial amount of bale wrap disposed about the shaft of each bale wrap assembly. For example, in certain embodiments, during the bale wrap assembly loading process, the operator may input the amount of bale wrap for each bale wrap assembly loaded into the storage compartment (e.g., during the process of loading the bale wrap assembly into the storage compartment). Additionally or alternatively, the controller may determine the amount of bale wrap for each bale wrap assembly as the bale wrap assembly is being loaded into the storage compartment (e.g., via a bar code reader configured to read a bar code on the bale wrap assembly, via a QR code reader configured to read a QR code on the bale wrap assembly, via an RFID reader configured to read an RFID tag on the bale wrap assembly, etc.). During the bale wrapping process, the controller may monitor the amount of bale wrap remaining on the shaft for the bale wrap assembly being used to wrap the bales and control the user interface to present the amount of bale wrap remaining.

Figure 4:
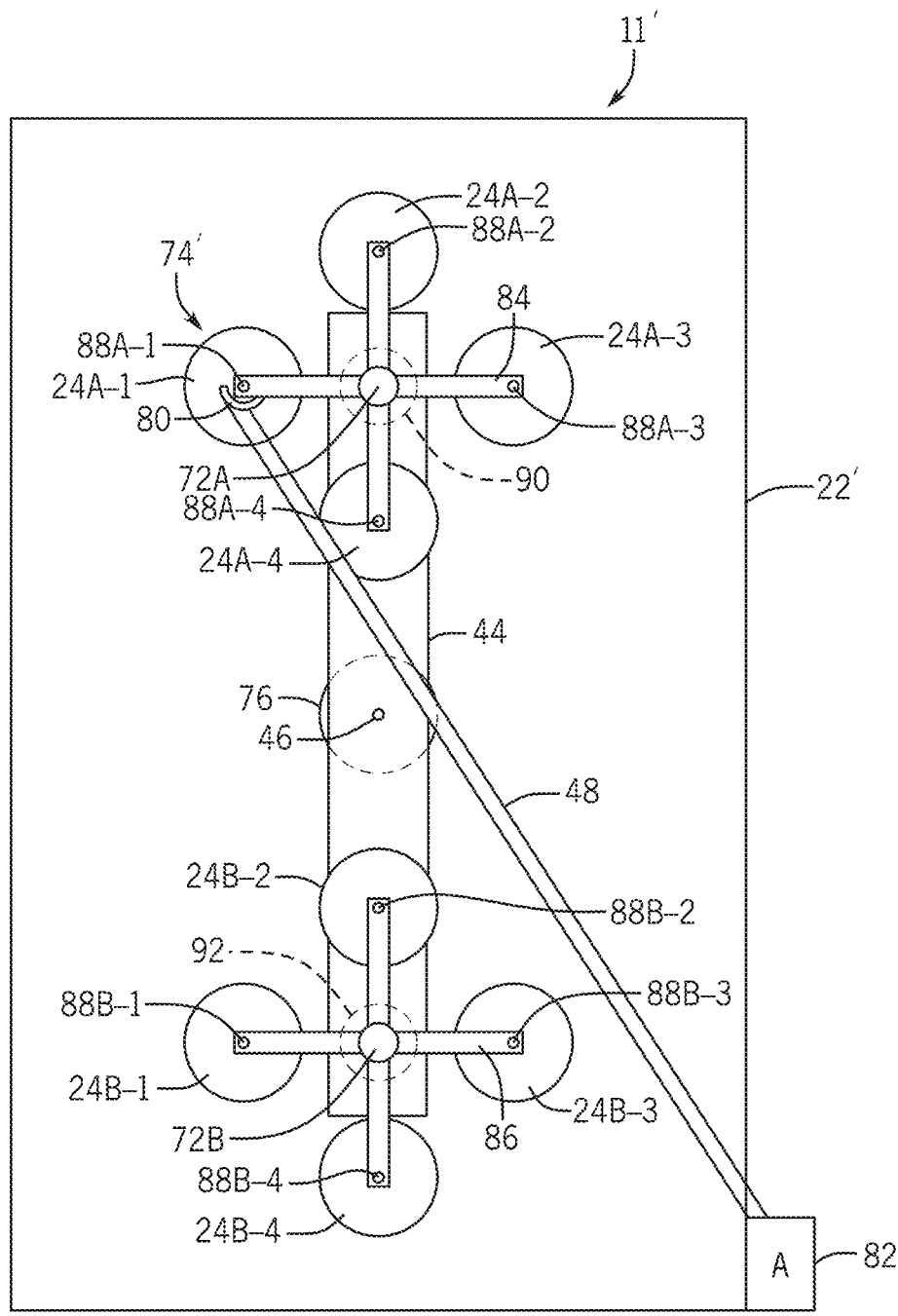
FIG. 4 is a side schematic view of another embodiment of a bale wrap assembly loading system, in which the bale wrap support is at a first loading angle, and the arm is in a transfer position.

FIG. 4 is a side schematic view of another embodiment of a bale wrap assembly loading system 11', in which the bale wrap support 44 is at a first loading angle, and the arm 48 is in a transfer position. In the illustrated embodiment, the storage compartment 22' includes a first rotary support assembly 84 rotatably coupled to the first bale wrap mount 72A. The first rotary support assembly 84 is configured to support multiple first bale wrap assemblies 24A. In addition, the storage compartment 22' includes a second rotary support assembly 86 coupled to the second bale wrap mount 72B. The second rotary support assembly 86 is configured to support multiple second bale wrap assemblies 24B. In the illustrated embodiment, each rotary support assembly is configured to support four respective bale wrap assemblies. However, in other embodiments, at least one rotary support assembly may be configured to support more or fewer respective bale wrap assemblies (e.g., 2, 3, 5, 6, or more).

In the illustrated embodiment, the first rotary support assembly 84 includes multiple first ancillary bale wrap mounts (e.g., first bale wrap mounts) 88A distributed about the first bale wrap mount 72A. In certain embodiments, the first rotary support assembly 84 includes a shaft configured to engage the first bale wrap mount 72A (e.g., in the same manner as the shaft of the first bale wrap assembly, as disclosed above with reference to FIGS. 3A-3D). Furthermore, each first ancillary bale wrap mount 88A is configured to support a respective first bale wrap assembly 24A, and the first rotary support assembly 84 is configured to rotate to position each first ancillary bale wrap mount 88A at the loading location 74' while the bale wrap support 44 is oriented at a first loading angle. Due to the offset between each first ancillary bale wrap mount 88A and the first bale wrap mount 72A, the first loading angle and/or the loading location 74' may be different than the first loading angle and/or the loading location 74 disclosed above with reference to FIGS. 3A-3D.

In the illustrated embodiment, the storage compartment 22' includes a first rotary support actuator 90 configured to drive the first rotary support assembly 84 to rotate (e.g., to position each first ancillary bale wrap mount 88A at the loading location 74'). The first rotary support actuator 90 may include any suitable type(s) of actuating device(s), such as one or more hydraulic cylinders, one or more pneumatic cylinders, one or more electric linear actuators, one or more electric motors, one or more hydraulic motors, one or more pneumatic motors, one or more other suitable actuating devices, or a combination thereof. Furthermore, in certain embodiments, the first rotary support actuator may be omitted, and the first rotary support assembly may be manually rotated (e.g., to position each first ancillary bale wrap mount at the loading location).

In the illustrated embodiment, the second rotary support assembly 86 includes multiple second ancillary bale wrap mounts (e.g., second bale wrap mounts) 88B distributed about the second bale wrap mount 72B. In certain embodiments, the second rotary support assembly 86 includes a shaft configured to engage the second bale wrap mount 72B (e.g., in the same manner as the shaft of the second bale wrap assembly, as disclosed above with reference to FIGS. 3A-3D). Furthermore, each second ancillary bale wrap mount 88B is configured to support a respective second bale wrap assembly 24B, and the second rotary support assembly 86 is configured to rotate to position each second ancillary bale wrap mount 88B at the loading location 74' while the bale wrap support 44 is oriented at a second loading angle. Due to the offset between each second ancillary bale wrap mount 88B and the second bale wrap mount 72B, the second loading angle and/or the loading location 74' may be different than the second loading angle and/or the loading location 74 disclosed above with reference to FIGS. 3A-3D.

In the illustrated embodiment, the storage compartment 22' includes a second rotary support actuator 92 configured to drive the second rotary support assembly 86 to rotate (e.g., to position each second ancillary bale wrap mount 88B at the loading location 74'). The second rotary support actuator 92 may include any suitable type(s) of actuating device(s), such as one or more hydraulic cylinders, one or more pneumatic cylinders, one or more electric linear actuators, one or more electric motors, one or more hydraulic motors, one or more pneumatic motors, one or more other suitable actuating devices, or a combination thereof. Furthermore, in certain embodiments, the second rotary support actuator may be omitted, and the second rotary support assembly may be manually rotated (e.g., to position each second ancillary bale wrap mount at the loading location).

To load eight bale wrap assemblies 24 into the storage compartment 22', the bale wrap support actuator 76 may rotate the bale wrap support 44 to orient the bale wrap support 44 at the first loading angle. The arm actuator 82 may then drive the arm 48 to move a first bale wrap assembly 24A-1 from the surface (e.g., the ground surface) to the loading location 74', and the first bale wrap assembly 24A-1 may engage a respective first ancillary bale wrap mount 88A-1 at the loading location 74', such that the first ancillary bale wrap mount 88A-1 supports the first bale wrap assembly 24A-1. Next, the first rotary support actuator 90 may rotate the first rotary support assembly 84 to position another first ancillary bale wrap mount 88A-2 at the loading location 74'. The arm actuator 82 may then drive the arm 48 to move another first bale wrap assembly 24A-2 from the surface (e.g., the ground surface) to the loading location 74', and the first bale wrap assembly 24A-2 may engage the first ancillary bale wrap mount 88A-2 at the loading location 74', such that the first ancillary bale wrap mount 88A-2 supports the first bale wrap assembly 24A-2. The process may be repeated for engaging two additional first bale wrap assemblies 24A-3 and 24A-4 with respective first ancillary bale wrap mounts 88A-3 and 88A-4, respectively.

After the first bale wrap assemblies 24A are coupled to the bale wrap support 44, the bale wrap support actuator 76 may rotate the bale wrap support 44 to orient the bale wrap support 44 at the second loading angle. The arm actuator 82 may then drive the arm 48 to move a second bale wrap assembly 24B-1 from the surface (e.g., the ground surface) to the loading location 74', and the second bale wrap assembly 24B-1 may engage a respective second ancillary bale wrap mount 88B-1 at the loading location 74', such that the second ancillary bale wrap mount 88B-1 supports the second bale wrap assembly 24B-1. Next, the second rotary support actuator 92 may rotate the second rotary support assembly 86 to position another second ancillary bale wrap mount 88B-2 at the loading location 74'. The arm actuator 82 may then drive the arm 48 to move another second bale wrap assembly 24B-2 from the surface (e.g., the ground surface) to the loading location 74', and the second bale wrap assembly 24B-2 may engage the second ancillary bale wrap mount 88B-2 at the loading location 74', such that the second ancillary bale wrap mount 88B-2 supports the second bale wrap assembly 24B-2. The process may be repeated for engaging two additional second bale wrap assemblies 24B-3 and 24B-4 with respective second ancillary bale wrap mounts 88B-3 and 88B-4, respectively.

To facilitate operation of the bale wrapping system, the bale wrap support actuator 76 may rotate the bale wrap support 44 to orient the bale wrap support 44 at a first working angle. In addition, the first rotary support actuator 90 may rotate the first rotary support assembly 84 to position a first bale wrap assembly 24A-1 at a working location suitable for providing the bale wrap of the first bale wrap assembly 24A-1 to the bale wrapping system. After the bale wrap of the first bale wrap assembly 24A-1 is depleted, the first rotary support actuator 90 may rotate the first rotary support assembly 84 to position another first bale wrap assembly 24A-2 at the working location, thereby enabling the bale wrap of the first bale wrap assembly 24A-2 to be provided to the bale wrapping system. The process may be repeated for positioning two additional first bale wrap assemblies 24A-3 and 24A-4 at the working location.

After the bale wraps of the first bale wrap assemblies 24A are depleted, the bale wrap support actuator 76 may rotate the bale wrap support 44 to orient the bale wrap support 44 at a second working angle. In addition, the second rotary support actuator 92 may rotate the second rotary support assembly 86 to position a second bale wrap assembly 24B-1 at the working location, thereby enabling the bale wrap of the second bale wrap assembly 24B-1 to be provided to the bale wrapping system. After the bale wrap of the second bale wrap assembly 24B-1 is depleted, the second rotary support actuator 92 may rotate the second rotary support assembly 86 to position another second bale wrap assembly 24B-2 at the working location, thereby enabling the bale wrap of the second bale wrap assembly 24B-2 to be provided to the bale wrapping system. The process may be repeated for positioning two additional second bale wrap assemblies 24B-3 and 24B-4 at the working location.

As previously discussed, in certain embodiments, the actuator assembly may move the storage compartment 22' to the intermediate position before the bale wrap support 44 rotates from the first working angle to the second working angle, thereby providing sufficient clearance for the bale wrap support to rotate. In such embodiments, the actuator assembly may move the storage compartment 22' in the laterally inward direction to the working position after the rotation. Furthermore, in certain embodiments, the agricultural system may be configured to provide sufficient clearance for the bale wrap support to rotate while the storage compartment 22' is in the working position. In such embodiments, the bale wrap support 44 may rotate without moving the storage compartment 22'.

While using the bale wraps of the bale wrap assemblies in a particular order is disclosed above, the bale wraps of the bale wrap assemblies may be used in any suitable order. The order may be stored within the controller of the agricultural system and/or the order may be controlled via the user interface. For example, in certain embodiments, the storage compartment 22' may store bale wrap assemblies 24 having different types of bale wraps. In such embodiments, the operator (e.g., via manual input to the user interface) and/or the controller (e.g., via an automatic operation) may select a particular bale wrap assembly (e.g., after the bale wrap of the previous bale wrap assembly is depleted). The controller may control the bale wrap support actuator 76 and a respective rotary support actuator to position the selected bale wrap assembly 24 at the working location, thereby enabling the bale wrap of the selected bale wrap assembly 24 to be provided to the bale wrapping system.

As previously discussed, in certain embodiments, to facilitate selection of the order, the type of bale wrap for each bale wrap assembly may be stored within the controller and, in certain embodiments, presented to the operator. For example, in certain embodiments, during the bale wrap assembly loading process, the operator may input the type of bale wrap for each bale wrap assembly loaded into the storage compartment (e.g., during the process of loading the bale wrap assembly into the storage compartment). Additionally or alternatively, the controller may determine the type of bale wrap for each bale wrap assembly as the bale wrap assembly is being loaded into the storage compartment (e.g., via a bar code reader configured to read a bar code on the bale wrap assembly, via a QR code reader configured to read a QR code on the bale wrap assembly, via an RFID reader configured to read an RFID tag on the bale wrap assembly, etc.). The controller may select the order based on the types of bale wraps of the bale wrap assemblies, and/or the controller may control the user interface to present the types of the bale wraps of the bale wrap assemblies to the operator, thereby enabling the operator to select the order.

In certain embodiments, the controller may store the initial amount of bale wrap disposed about the shaft of each bale wrap assembly. For example, in certain embodiments, during the bale wrap assembly loading process, the operator may input the amount of bale wrap for each bale wrap assembly loaded into the storage compartment (e.g., during the process of loading the bale wrap assembly into the storage compartment). Additionally or alternatively, the controller may determine the amount of bale wrap for each bale wrap assembly as the bale wrap assembly is being loaded into the storage compartment (e.g., via a bar code reader configured to read a bar code on the bale wrap assembly, via a QR code reader configured to read a QR code on the bale wrap assembly, via an RFID reader configured to read an RFID tag on the bale wrap assembly, etc.). During the bale wrapping process, the controller may monitor the amount of bale wrap remaining on the shaft for the bale wrap assembly being used to wrap the bales and control the user interface to present the amount of bale wrap remaining.

In certain embodiments, the arm 48 may be used to remove the shafts of the bale wrap assemblies 24 after the bale wraps of the bale wrap assemblies 24 are depleted. For example, the bale wrap support actuator 76, the first rotary support actuator 90, and the second rotary support actuator 92 may be controlled to successively position each shaft at the loading location. Once each shaft is positioned at the loading location, the arm actuator 82 may rotate the arm 48 to the transfer position, thereby enabling the arm 48 to engage the shaft 70. The arm actuator 82 may then rotate the arm 48 to the engagement position, thereby facilitating removal of the shaft from the arm 48. The process of removing each shaft may continue until all shafts are removed from the storage compartment 22'.

Each ancillary bale wrap mount may include any of the features and variations disclosed above with reference to the bale wrap mount, as disclosed above with reference to FIGS. 3A-3D. For example, in certain embodiments, each ancillary bale wrap mount may include a respective set of hooks, and each set of hooks may be configured to engage the shaft of a respective bale wrap assembly. Furthermore, in certain embodiments, each ancillary bale wrap mount may include a respective locking mechanism (e.g., configured to cooperate with the respective set of hooks to secure a bale wrap assembly to the respective rotary support assembly). Furthermore, the process of engaging and disengaging the locking mechanism disclosed above with regard to the bale wrap mounts applies to engaging and disengaging the locking mechanisms of the ancillary bale wrap mounts.

As previously discussed, in certain embodiments, each rotary support assembly includes a shaft configured to engage a respective bale wrap mount. In such embodiments, at least one of the rotary support assemblies may not be engaged with the respective bale wrap mount (e.g., at least one rotary support assembly may be omitted). For example, in certain embodiments, the first rotary support assembly may be omitted. Accordingly, the bale wrap support may support the second rotary support assembly and a single first bale wrap assembly (e.g., which may be significantly larger than the second bale wrap assemblies supported by the second rotary support assembly). Because each rotary support assembly is configured to engage a respective bale wrap mount, the bale wrap support may support one bale wrap assembly on one bale wrap mount and a rotary support assembly on the other bale wrap mount, two rotary support assemblies, as illustrated, or two single bale wrap assemblies, as disclosed above with reference to FIGS. 3A-3D. Furthermore, in embodiments in which the bale wrap support includes three or more bale wrap mounts, one rotary support assembly or one bale wrap assembly may be engaged with each bale wrap mount. In addition, in certain embodiments, at least one bale wrap mount may be omitted, and respective rotary support assembly/assemblies may be rotatably coupled to the bale wrap support by another suitable type of connection. Furthermore, while each rotary support assembly is configured to rotate in the illustrated embodiment, in other embodiments, at least one rotary support assembly may be configured to translate or rotate/translate to position each ancillary bale wrap mount at the loading location.

While the illustrated bale wrap assembly loading system 11' includes rotary support assemblies and rotary support actuators, as disclosed above with reference to FIG. 4, the remaining elements of the bale wrap assembly loading system 11' may be the same as the bale wrap assembly loading system disclosed above with reference to FIGS. 2A-3D (e.g., in which like characters represent like elements). Accordingly, any of the details and variations disclosed above with regard to the bale wrap assembly loading system of FIGS. 2A-3D may apply to the illustrated bale wrap assembly loading system 11', except with regard to the rotary support assemblies and the rotary support actuators.

Figure 5:
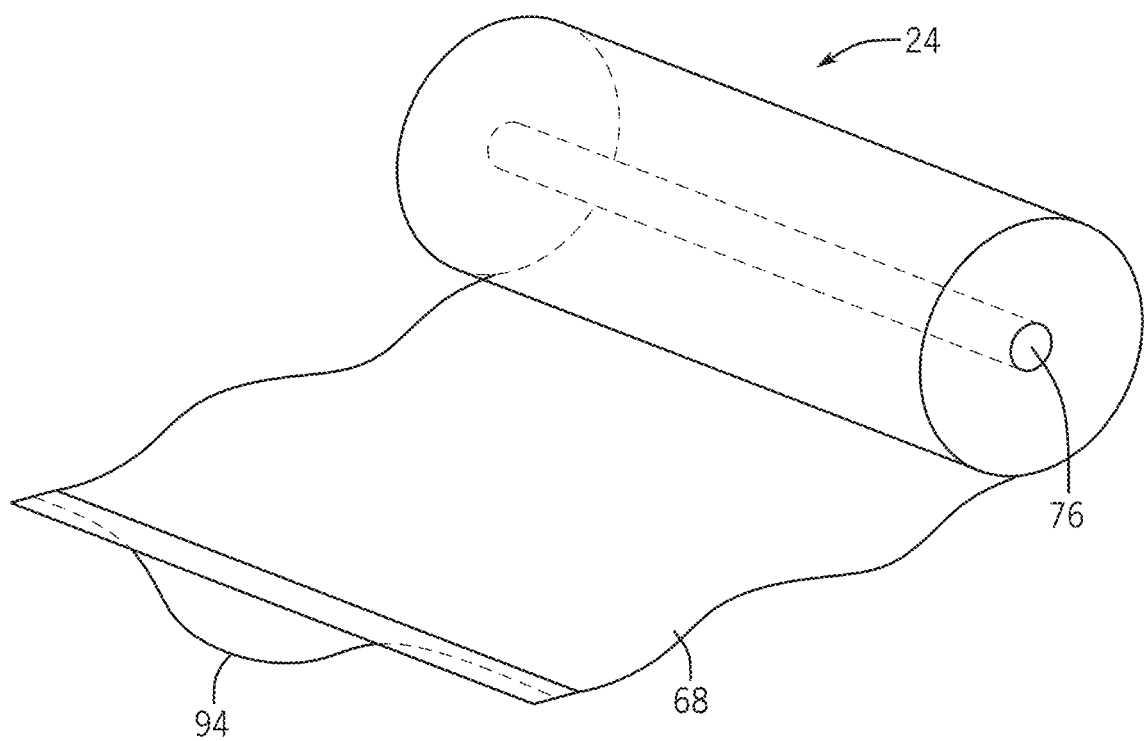
FIG. 5 is a perspective view of an embodiment of a bale wrap assembly that may be loaded using the bale wrap assembly loading system of FIG. 2A or the bale wrap assembly loading system of FIG. 4.

FIG. 5 is a perspective view of an embodiment of a bale wrap assembly 24 that may be loaded using the bale wrap assembly loading system of FIG. 2A or the bale wrap assembly loading system of FIG. 4. As previously discussed, the bale wrap assembly 24 includes a bale wrap 68 and a shaft 70, in which the bale wrap 68 is wrapped around the shaft 70. In the illustrated embodiment, the bale wrap assembly 24 also includes a cord 94 coupled to the bale wrap 68. The cord 94 may be formed from any suitable material(s), such as plastic, metal, cotton, hemp, etc. Furthermore, the cord 94 may be coupled to the bale wrap 68 via any suitable type(s) of connection(s), such as a fastener connection, an adhesive connection, a sewn connection, other suitable type(s) of connection(s), or a combination thereof. As discussed in detail below, a feeding mechanism of the bale wrap assembly loading system is configured to engage the cord while the bale wrap assembly is in the working location, and the feeding mechanism is configured to direct the bale wrap 68 toward the bale via the cord 94.

Figure 6:
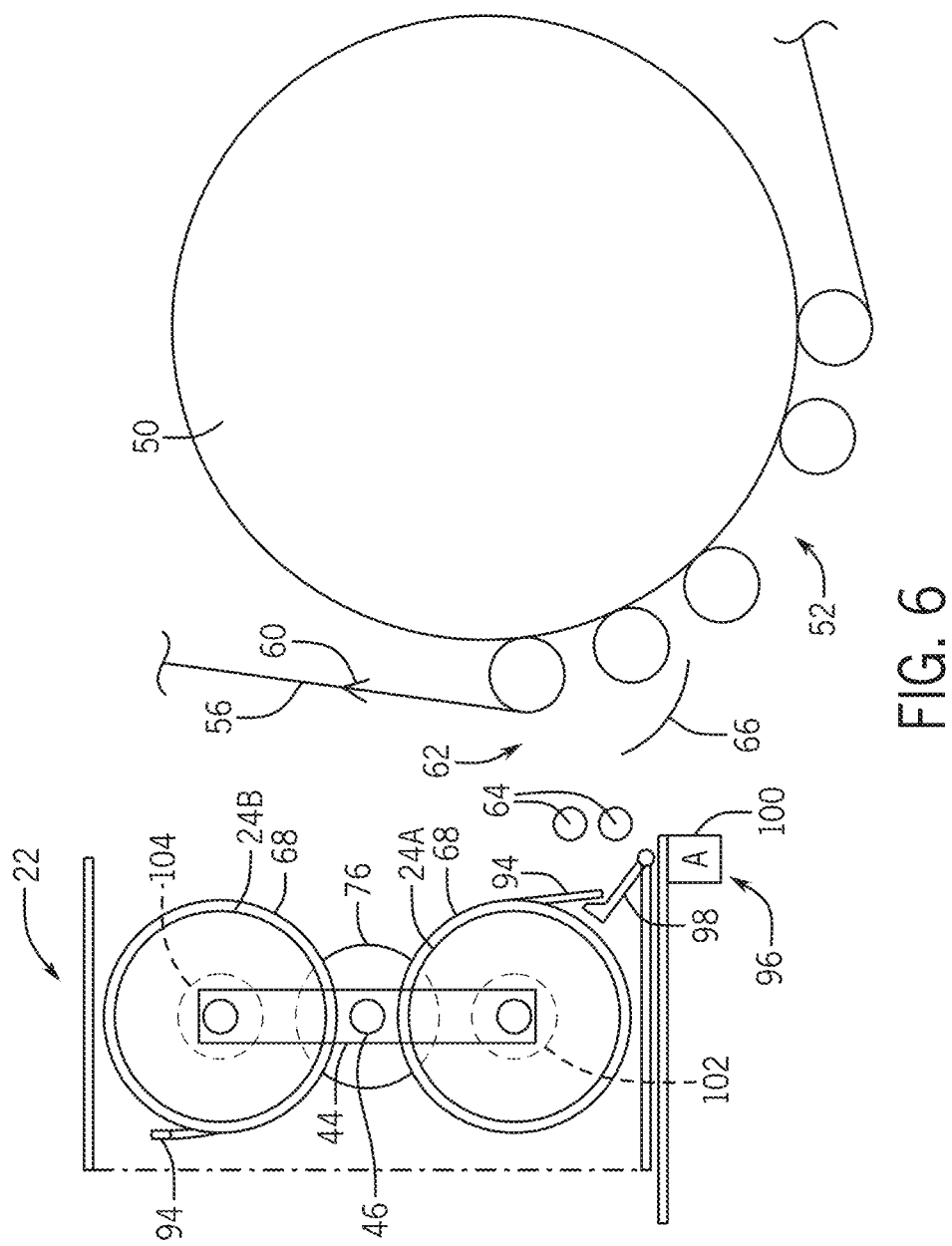
FIG. 6 is a side schematic view of an embodiment of a feeding mechanism that may be employed within the bale wrap assembly loading system of FIG. 2A or the bale wrap assembly loading system of FIG. 4.

FIG. 6 is a side schematic view of an embodiment of a feeding mechanism 96 that may be employed within the bale wrap assembly loading system of FIG. 2A or the bale wrap assembly loading system of FIG. 4. The feeding mechanism 96 is configured to engage the cord 94 of each bale wrap assembly 24 while the bale wrap assembly 24 is in the working location. In addition, the feeding mechanism 96 is configured to direct the bale wrap 68 of the bale wrap assembly 24 toward the bale 50 via the cord 94. In the illustrated embodiment, the feeding mechanism 96 includes a hook 98 configured to rotate between a storage position and a feeding position. While the bale wrap assembly 24 is in the working location and the hook 98 is in the storage position, the cord 94 may be aligned with the hook 98. The hook 98 may be driven to rotate from the storage position to the feeding position, thereby driving the cord to move the bale wrap 68 into engagement with the feed roller(s) 64. As previously discussed, the feed roller(s) 64 drive the bale wrap 68 over the wrap guide/wrap applicator 66 (e.g., duckbill). The wrap guide/wrap applicator 66 then moves (e.g., rotates) to direct the bale wrap 68 into contact with the bale 50. The bale wrap 68 is captured between the bale 50 and the belt(s) 56. Accordingly, rotation of the bale 50 draws the bale wrap 68 around the bale 50, thereby wrapping the bale 50.

In the illustrated embodiment, the feeding mechanism 96 includes a hook actuator 100 configured to drive the hook 98 to rotate (e.g., between the illustrated storage position and the feeding position). The hook actuator 98 may include any suitable type(s) of actuating device(s), such as one or more hydraulic cylinders, one or more pneumatic cylinders, one or more electric linear actuators, one or more electric motors, one or more hydraulic motors, one or more pneumatic motors, one or more other suitable actuating devices, or a combination thereof. Furthermore, in certain embodiments, the hook actuator may be omitted, and the hook may be manually rotated (e.g., between the illustrated storage position and the feeding position).

While the feeding mechanism 96 includes a single hook 98 in the illustrated embodiment, in other embodiments, the feeding mechanism may include multiple hooks (e.g., 2, 3, 4, 5, 6, or more). Furthermore, in certain embodiments, the feeding mechanism may include other suitable device(s) (e.g., alone or in combination with the hook(s)) configured to drive the cord to move the bale wrap toward the bale, such as rod(s), fork(s), other suitable device(s), or a combination thereof. In addition, in the illustrated embodiment, the feeding mechanism 96 is coupled to the storage compartment 22. However, in other embodiments, the feeding mechanism may be coupled to the frame/chassis of the agricultural system.

In the illustrated embodiment, the storage compartment 22 includes a first bale wrap mount actuator 102 configured to drive the first bale wrap assembly 24A to rotate. In addition, the storage compartment 22 includes a second bale wrap mount actuator 104 configured to drive the second bale wrap assembly 24B to rotate. Each bale wrap mount actuator may be configured to drive the bale wrap assembly 24 to rotate to align the cord 94 with the hook 98. For example, while the bale wrap assembly 24 is in the working location, the bale wrap mount actuator may drive the bale wrap assembly to rotate to align the cord 94 with the hook 98 before the hook 98 rotates from the storage position to the feeding position. Alternatively, while the bale wrap assembly 24 is in the loading location (e.g., after the shaft of the bale wrap assembly 24 is engaged with the bale wrap mount), the bale wrap mount actuator may drive the bale wrap assembly 24 to rotate to position the cord 94 such that the cord 94 aligns with the hook 98 when the bale wrap assembly reaches the working location. Furthermore, in certain embodiments, each bale wrap mount actuator may drive the respective bale wrap assembly 24 to rotate as the hook 98 rotates from the storage position to the feeding position, such that the combined force of the hook actuator 100 and the bale wrap mount actuator drives the bale wrap assembly 24 to rotate as the bale wrap 68 moves toward the bale 50. As a result, the load on the hook actuator 100 may be reduced (e.g., which may facilitate use of a less powerful and less costly hook actuator).

While the storage compartment 22 includes the first bale wrap mount actuator 102 and the second bale wrap mount actuator 104 in the illustrated embodiment, in other embodiments at least one bale wrap mount actuator may be omitted. In such embodiments, the bale wrap assembly may be manually rotated to align the cord with the hook.

Furthermore, in certain embodiments, the storage compartment may include at least one locking mechanism configured to temporarily block rotation of a respective bale wrap assembly. For example, while the bale wrap assembly is in the loading location, the bale wrap assembly may be rotated to position the cord such that the cord aligns with the hook when the bale wrap assembly reaches the working location. The locking mechanism may then be engaged to block rotation of the bale wrap assembly. The locking mechanism may be disengaged (e.g., manually or automatically) as/after the bale wrap assembly reaches the working location. In certain embodiments, the locking mechanism may include a clamp configured to engage an end of the bale wrap or the cord, or the locking mechanism may include a locking hook configured to engage the cord. Additionally or alternatively, in certain embodiments, the locking mechanism may include a mechanical stop configured to engage the shaft of the bale wrap assembly to block rotation of the bale wrap assembly. Furthermore, in certain embodiments, the feeding mechanism may include a sensor configured to detect alignment of the cord with the hook. In such embodiments, the hook actuator may drive the hook to rotate from the storage position to the feeding position upon detection of the cord/hook alignment.

To facilitate wrapping the bale 50 with a bale wrap 68 while the first bale wrap assembly 24A is in the illustrated working location, the hook actuator 100 drives the hook 98 to rotate from the illustrated storage position to the feeding position, thereby driving the cord 94 to move the bale wrap 68 into engagement with the feed roller(s) 64. In certain embodiments, the first bale wrap mount actuator 102 drives the first bale wrap assembly 24A to rotate as the hook 98 moves from the storage position to the feeding position. After the bale wrap 68 is engaged with the feed roller(s) 64, the hook actuator 100 drives the hook 98 from the feeding position to the storage position. After the bale wrap 68 of the first bale wrap assembly 24A is depleted, the bale wrap support 44 may rotate (e.g., via the bale wrap support actuator 76) to the second working angle, thereby positioning the second bale wrap assembly 24B at the working location suitable for providing the bale wrap 68 of the second bale wrap assembly 24B to the bale wrapping system 62. In certain embodiments (e.g., in embodiments in which the bale wrap assembly is not rotated for alignment of the cord and the hook while the bale wrap assembly is in the loading location), the second bale wrap mount actuator 104 may drive the second bale wrap assembly 24B to rotate to align the cord 94 with the hook 98. The hook actuator 100 then drives the hook 98 to rotate from the storage position to the feeding position, thereby driving the cord 94 to move the bale wrap 68 into engagement with the feed roller(s) 64. In certain embodiments, the second bale wrap mount actuator 104 drives the second bale wrap assembly 24B to rotate as the hook 98 moves from the storage position to the feeding position. After the bale wrap 68 is engaged with the feed roller(s) 64, the hook actuator 100 drives the hook 98 from the feeding position to the storage position. While the cord 94, the feeding mechanism 96, the bale wrap mount actuator(s), the locking mechanism(s), and the sensor are disclosed above with reference to the bale wrap assembly loading system of FIGS. 2A-3D, any or all of the cord, the feeding mechanism, the bale wrap mount actuator(s) (e.g., which may be configured to drive respective bale wrap assembly/assemblies to rotate relative to the respective rotary support assembly/assemblies), the locking mechanism(s), and the sensor may be employed within the bale wrap assembly loading system of FIG. 4. Accordingly, any of the details and variations disclosed above with regard to the cord 94, the feeding mechanism 96, the bale wrap mount actuator(s), the locking mechanism(s), and the sensor may apply to the bale wrap assembly loading system of FIG. 4. Furthermore, in certain embodiments, the cord, the feeding mechanism, the bale wrap mount actuator(s), the locking mechanism(s), the sensor, or any combination thereof, may be omitted (e.g., the bale wrap assembly loading system may not include a feeding mechanism).

Figure 7:
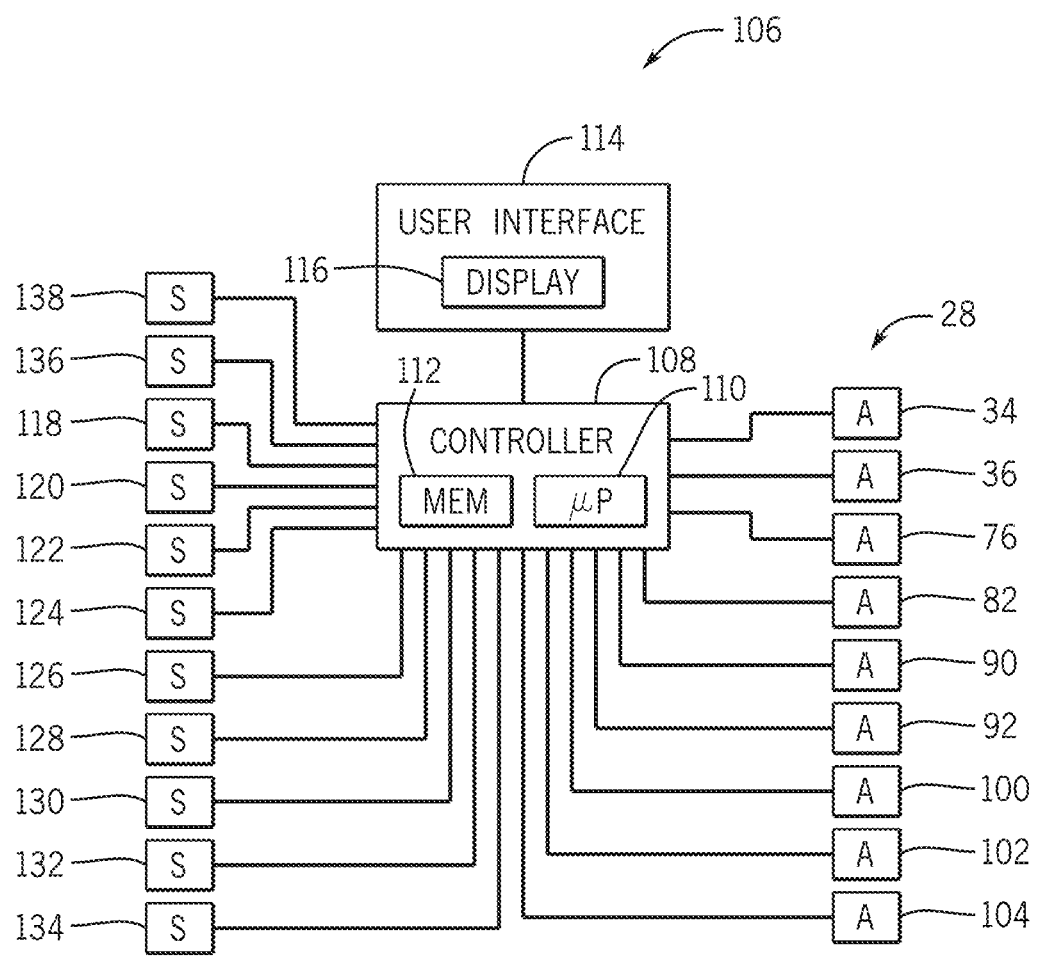
FIG. 7 is a block diagram of an embodiment of a control system that may be employed within the bale wrap assembly loading system of FIG. 2A or the bale wrap assembly loading system of FIG. 4.

FIG. 7 is a block diagram of an embodiment of a control system 106 that may be employed within the bale wrap assembly loading system of FIG. 2A or the bale wrap assembly loading system of FIG. 4. In the illustrated embodiment, the control system 106 includes a controller 108 configured to identify bale wrap assemblies within the storage compartment, thereby facilitating selection of a bale wrap assembly having a desired type of bale wrap for use by the bale wrapping system. In certain embodiments, the controller 108 is an electronic controller having electrical circuitry configured to identify bale wrap assemblies within the storage compartment. In the illustrated embodiment, the controller 108 includes a processor, such as the illustrated microprocessor 110, and a memory device 112. The controller 108 may also include one or more storage devices and/or other suitable components. The processor 110 may be used to execute software, such as software for identifying bale wrap assemblies, and so forth. Moreover, the processor 110 may include multiple microprocessors, one or more "general-purpose" microprocessors, one or more special-purpose microprocessors, and/or one or more application specific integrated circuits (ASICs), or some combination thereof. For example, the processor 110 may include one or more reduced instruction set (RISC) processors.

The memory device 112 may include a volatile memory, such as random access memory (RAM), and/or a nonvolatile memory, such as read-only memory (ROM). The memory device 112 may store a variety of information and may be used for various purposes. For example, the memory device 112 may store processor-executable instructions (e.g., firmware or software) for the processor 110 to execute, such as instructions for identifying bale wrap assemblies, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for identifying bale wrap assemblies, etc.), and any other suitable data.

In the illustrated embodiment, the control system 106 includes a user interface 114 communicatively coupled to the controller 108. The user interface 114 is configured to receive input from an operator and to provide information to the operator. The user interface 114 may include any suitable input device(s) for receiving input, such as a keyboard, a mouse, button(s), switch(es), knob(s), other suitable input device(s), or a combination thereof. In addition, the user interface 114 may include any suitable output device(s) for presenting information to the operator, such as speaker(s), indicator light(s), other suitable output device(s), or a combination thereof. In the illustrated embodiment, the user interface 114 includes a display 116 configured to present visual information to the operator. In certain embodiments, the display 116 may include a touchscreen interface configured to receive input from the operator.

In the illustrated embodiment, the control system 106 also includes a bale wrap support sensor 118 communicatively coupled to the controller 108. The bale wrap support sensor 118 is configured to output a bale wrap support sensor signal indicative of the orientation of the bale wrap support. The bale wrap support sensor 118 may include any suitable type(s) of sensor device(s) configured to monitor the orientation of the bale wrap support, such as rotary potentiometer(s), infrared sensor(s), camera(s), magnetic sensor(s), other suitable type(s) of sensor device(s), or a combination thereof. The controller 108 is configured to receive the bale wrap support sensor signal, and the controller is configured to determine whether the bale wrap support is oriented at the first loading angle, the second loading angle, the first working angle, or the second working angle based on the orientation of the bale wrap support. In certain embodiments, the controller 108 is configured to control the user interface 114 to present an indication (e.g., on the display 116) of the orientation of the bale wrap support (e.g., whether the bale wrap support is oriented at the first loading angle, at the second loading angle, at the first working angle, or at the second working angle).

In certain embodiments (e.g., in embodiments in which the storage compartment does not include rotary support assembly/assemblies), the controller 108 may determine the bale wrap support is oriented at the first loading angle based on the orientation of the bale wrap support. In addition, the controller 108 may identify the first bale wrap assembly mounted on the first bale wrap mount in response to determining the bale wrap support is oriented at the first loading angle. Furthermore, the controller 108 may determine the bale wrap support is oriented at the second loading angle based on the orientation of the bale wrap support. The controller 108 may also identify the second bale wrap assembly mounted on the second bale wrap mount in response to determining the bale wrap support is oriented at the second loading angle. Accordingly, the controller 108 may store the identity of each bale wrap assembly within the storage compartment.

In certain embodiments, the controller 108 is configured to receive a first bale wrap signal indicative of the type of bale wrap of the first bale wrap assembly, and the controller 108 is configured to associate the type of bale wrap of the first bale wrap assembly with the first bale wrap assembly. In addition, the controller 108 is configured to receive a second bale wrap signal indicative of a type of bale wrap of the second bale wrap assembly, and the controller 108 is configured to associate the type of bale wrap of the second bale wrap assembly with the second bale wrap assembly. As used herein with regard to bale wrap types, "associate" refers to the controller 108 storing the type of bale wrap of the respective bale wrap assembly in a manner that links the type of bale wrap with the respective bale wrap assembly.

In certain embodiments, the first bale wrap signal and the second bale wrap signal may be output by user interface 114. For example, during the bale wrap assembly loading process (e.g., after the controller 108 identifies the bale wrap assembly mounted on the respective bale wrap mount, as the bale wrap assembly is being moved by the arm from the surface to the loading location, etc.), the operator may manually input the type of bale wrap of the respective bale wrap assembly into the user interface 114, and the user interface may output a corresponding bale wrap signal. Furthermore, in certain embodiments, the control system 106 includes a bale identification sensor 120 communicatively coupled to the controller 108. The bale identification sensor 120 is configured to output the first bale wrap signal and the second bale wrap signal. The bale identification sensor 120 may include any suitable type(s) of sensor device(s) configured to identify the type of bale wrap of each bale wrap assembly. For example, as previously discussed, the bale identification sensor 120 may include a bar code reader configured to read a bar code on the bale wrap assembly, a QR code reader configured to read a QR code on the bale wrap assembly, an RFID reader configured to read an RFID tag on the bale wrap assembly, other suitable type(s) of sensor device(s), or a combination thereof. In certain embodiments, the controller 108 may enable the operator to override the type of bale wrap of each bale wrap assembly via input to the user interface 114. Furthermore, in certain embodiments, after the controller 108 associates the type of bale wrap of each bale wrap assembly with the bale wrap assembly, the controller 108 may control the user interface 114 to present an indication (e.g., on the display 116) of the type of bale wrap of the bale wrap assembly.

After the bale wrap assemblies are disposed within the storage compartment, the order of use of the bale wrap assemblies may be selected. For example, in certain embodiments, the controller 108 may control the user interface 114 to present an indication (e.g., on the display 116) of the types of the bale wraps of the bale wrap assemblies. In such embodiments, the operator may select the order via input to the user interface 114, and the controller 108 may control the bale wrap support actuator 76 to facilitate use of the bale wrap assemblies in the selected order. Furthermore, in certain embodiments, the controller 108 may automatically select the order based on the types of bale wraps of the bale wrap assemblies. In such embodiments, the controller 108 may control the user interface 114 to present an indication (e.g., on the display 116) of the types of bale wraps of the bale wrap assemblies, and, in certain embodiments, the controller 108 may enable the operator to override the order via the user interface 114 (e.g., before or during the harvesting operation). Furthermore, in certain embodiments, the order may not be determined, and the controller 108 and/or the operator (e.g., via the user interface 114) may select the first/next bale wrap assembly to be used by the bale wrapping system (e.g., after the bale wrap of the previous bale wrap assembly is depleted, before the bale wrap of the previous bale wrap assembly is depleted, etc.).

As previously discussed, in certain embodiments, the bale wrap assembly loading system includes the bale wrap support actuator 76, which is configured to drive the bale wrap support to rotate. In the illustrated embodiment, the bale wrap support actuator 76 is communicatively coupled to the controller 108. In certain embodiments, the controller 108 is configured to control the bale wrap support actuator 76 based on feedback from the bale wrap support sensor 118. Furthermore, in certain embodiments, the controller 108 is configured to control the bale wrap support actuator 76 to drive the bale wrap support to the first working angle to position the first bale wrap assembly (e.g., the first bale wrap mount) at the working location in response to selection of the first bale wrap assembly. In addition, the controller 108 is configured to control the bale wrap support actuator 76 to drive the bale wrap support to the second working angle to position the second bale wrap assembly (e.g., the second bale wrap mount) at the working location in response to selection of the second bale wrap assembly. The controller 108 may determine which bale wrap assembly is selected based on the order or controller/operator selection, as disclosed above. As previously discussed, with the bale wrap assembly in the working location, the bale wrap of the bale wrap assembly may be provided to the bale wrapping system to facilitate wrapping the bale.

In certain embodiments, the control system 106 includes a first bale wrap mount sensor 122 and a second bale wrap mount sensor 124. The first bale wrap mount sensor 122 is communicatively coupled to the controller 108, and the second bale wrap mount sensor 124 is communicatively coupled to the controller 108. The first bale wrap mount sensor 122 is configured to output a first bale wrap mount signal indicative of engagement of the first bale wrap assembly with the first bale wrap mount. In addition, the second bale wrap mount sensor 124 is configured to output a second bale wrap mount signal indicative of engagement of the second bale wrap assembly with the second bale wrap mount. Each bale wrap mount sensor may include any suitable type(s) of sensor device(s), such as camera(s), infrared sensor(s), ultrasonic sensor(s), contact sensor(s), Hall effect sensor(s), capacitive sensor(s), inductive sensor(s), other suitable type(s) of sensor device(s), or a combination thereof.

In embodiments including the first and second bale wrap mount sensors, the controller 108 is configured to identify the first bale wrap assembly mounted on the first bale wrap mount in response to determining the bale wrap support is oriented at the first loading angle and the first bale wrap assembly is engaged with the first bale wrap mount. In addition, the controller 108 is configured to identify the second bale wrap assembly mounted on the second bale wrap mount in response to determining the bale wrap support is oriented at the second loading angle and the second bale wrap assembly is engaged with the second bale wrap mount. Accordingly, the controller 108 may store the identity of each bale wrap assembly within the storage compartment.

As previously discussed, in certain embodiments, the storage compartment is movable relative to the baler. The storage compartment is configured to be positioned proximate to the surface while in the loading position, and the storage compartment is configured to be positioned proximate to the bale while in the working position. In addition, the storage compartment is configured to move in the upward direction and in the laterally inward direction from the loading position to the working position. Furthermore, as previously discussed, in certain embodiments, the bale wrap assembly loading system includes the actuation assembly 28 configured to drive the storage compartment to move in the upward direction from the loading position to the intermediate position and to move in the laterally inward direction from the intermediate position to the working position. In the illustrated embodiment, the actuation assembly 28 is communicatively coupled to the controller 108, and the controller 108 is configured to control the actuation assembly 28 to drive the storage compartment to move between the loading position and the working position. Furthermore, in the illustrated embodiment, the actuation assembly 28 includes the first actuator 34, which is configured to drive the storage compartment to move in the upward and downward directions, and the second actuator 36, which is configured to drive the storage compartment to move in the laterally inward and laterally outward directions. As illustrated, the first and second actuators are communicatively coupled to the controller 108, and the controller 108 is configured to control the first and second actuators of the actuation assembly 28 to drive the storage compartment to move between the loading position and the working position.

In the illustrated embodiment, the control system 106 includes a storage compartment sensor assembly 126 communicatively coupled to the controller 108. The storage compartment sensor assembly 126 is configured to output a storage compartment sensor signal indicative of a position of the storage compartment relative to the baler and/or a position of the storage compartment relative to the surface. The storage compartment sensor assembly 126 may include any suitable type(s) of sensor device(s) configured to monitor the position of the storage compartment. For example, in certain embodiments, the storage compartment sensor assembly 126 may include linear variable differential transformer(s) (LVDT(s)), linear potentiometer(s), Hall effect sensor(s), capacitive sensor(s), infrared sensor(s), ultrasonic sensor(s), RADAR sensor(s), LiDAR sensor(s), other suitable type(s) of sensor device(s), or a combination thereof. In certain embodiments, the storage compartment sensor assembly 126 may include a first sensor configured to monitor a vertical position of the storage compartment relative to the baler and/or relative to the surface, and the storage compartment sensor assembly 126 may include a second sensor configured to monitor a lateral position of the storage compartment relative to the baler and/or relative to the surface. Furthermore, in certain embodiments, the storage compartment sensor assembly 126 may include a single sensor configured to monitor the vertical position and the lateral position of the storage compartment relative to the baler and/or relative to the surface.

In certain embodiments, the controller 108 is configured to determine the position of the storage compartment based on feedback from the storage compartment sensor assembly 126. For example, the controller 108 may determine whether the storage compartment is in the working position, the intermediate position, or the loading position based on feedback from the storage compartment sensor assembly 126. In certain embodiments, the controller 108 is configured to control the user interface 114 to present an indication (e.g., on the display 116) of the position of the storage compartment (e.g., whether the storage compartment is in the working position, in the intermediate position, or in the loading position). Furthermore, in certain embodiments, the controller 108 is configured to control the actuation assembly 28 based on feedback from the storage compartment sensor assembly 126. For example, the controller 108 may control the first actuator 34 based on the vertical position of the storage compartment, and the controller 108 may control the second actuator 36 based on the lateral position of the storage compartment.

As previously discussed, in certain embodiments, the bale wrap assembly loading system includes the feeding mechanism. The feeding mechanism is configured to engage a cord of each bale wrap assembly while the bale wrap assembly is in the working location. In addition, the feeding mechanism is configured to drive the bale wrap of the bale wrap assembly toward the bale via the cord. For example, in certain embodiments, the feeding mechanism includes the hook configured to rotate between the storage position and the feeding position. While the bale wrap assembly is in the working location and the hook is in the storage position, the cord may be aligned with the hook. The hook may be driven to rotate from the storage position to the feeding position, thereby driving the cord to move the bale wrap toward the bale. Furthermore, in certain embodiments, the feeding mechanism includes the hook actuator 100 configured to drive the hook to rotate between the storage and feeding positions. In the illustrated embodiment, the hook actuator 100 is communicatively coupled to the controller 108. Accordingly, the controller 108 may control the hook actuator 100 to drive the hook to rotate between the storage position and the feeding position.

In the illustrated embodiment, the control system 106 includes a feeding mechanism sensor 128 communicatively coupled to the controller 108. The feeding mechanism sensor 128 is configured to output a hook position signal indicative of a position of the hook of the feeding mechanism. The feeding mechanism sensor 128 may include any suitable type(s) of sensor device(s) configured to monitor the position of the hook. For example, in certain embodiments, the feeding mechanism sensor 128 may include rotary potentiometer(s), LVDT(s), linear potentiometer(s), Hall effect sensor(s), capacitive sensor(s), infrared sensor(s), ultrasonic sensor(s), other suitable type(s) of sensor device(s), or a combination thereof.

In certain embodiments, the controller 108 is configured to determine the position of the hook based on feedback from the feeding mechanism sensor 128. For example, the controller 108 may determine whether the hook is in the storage position or the feeding position based on feedback from the feeding mechanism sensor 128. In certain embodiments, the controller 108 is configured to control the user interface 114 to present an indication (e.g., on the display 116) of the position of the hook (e.g., whether the hook is in the storage position or in the feeding position). Furthermore, in certain embodiments, the controller 108 is configured to control the hook actuator 100 based on feedback from the feeding mechanism sensor 128. In certain embodiments, the controller 108 may control the actuation assembly 28 to move the storage compartment from the working position to the loading position only after determining that the hook is in the storage position.

As previously discussed, in certain embodiments, the bale wrap assembly loading system includes the first bale wrap mount actuator 102 and the second bale wrap mount actuator 104. The first bale wrap mount actuator 102 is configured to drive the first bale wrap assembly to rotate relative to the bale wrap support, and the second bale wrap mount actuator 104 is configured to drive the second bale wrap assembly to rotate relative to the bale wrap support. In the illustrated embodiment, the first bale wrap mount actuator 102 is communicatively coupled to the controller 108, and the second bale wrap mount actuator 104 is communicatively coupled to the controller 108. In certain embodiments, the controller 108 is configured to control the hook actuator 100 in combination with a respective bale wrap mount actuator (e.g., the bale wrap mount actuator configured to drive the bale wrap assembly in the working location to rotate). For example, the bale wrap mount actuator may drive the respective bale wrap assembly to rotate as the hook actuator 100 drives the hook to rotate from the storage position to the feeding position, such that the combined force of the hook actuator 100 and the bale wrap mount actuator drives the bale wrap assembly to rotate as the bale wrap moves toward the bale. As a result, the load on the hook actuator 100 may be reduced (e.g., which may facilitate use of a less powerful and less costly hook actuator).

Furthermore, in certain embodiments, the controller 108 may control each bale wrap mount actuator to drive the bale wrap assembly to rotate to align the cord with the hook. For example, while the bale wrap assembly is in the working location, the controller 108 may control the respective bale wrap mount actuator to drive the bale wrap assembly to rotate to align the cord with the hook before the controller 108 controls the hook actuator 100 to drive the hook to rotate from the storage position to the feeding position. Alternatively, while the bale wrap assembly is in the loading location (e.g., after the shaft of the bale wrap assembly is engaged with the bale wrap mount), the controller 108 may control the respective bale wrap mount actuator to drive the bale wrap assembly to rotate to position the cord such that the cord aligns with the hook when the bale wrap assembly reaches the working location.

In the illustrated embodiment, the control system 106 includes a bale wrap assembly orientation sensor assembly 130 communicatively coupled to the controller 108. The bale wrap assembly orientation sensor assembly 130 is configured to output a bale wrap assembly orientation signal indicative of an orientation of each bale wrap assembly relative to the bale wrap support. The bale wrap assembly orientation sensor assembly 130 may include any suitable type(s) of sensor device(s) configured to monitor the orientation of each bale wrap assembly relative to the bale wrap support. For example, in certain embodiments, the bale wrap assembly orientation sensor assembly 130 may include rotary potentiometer(s), Hall effect sensor(s), capacitive sensor(s), infrared sensor(s), ultrasonic sensor(s), camera(s), other suitable type(s) of sensor device(s), or a combination thereof. In certain embodiments, the bale wrap assembly orientation sensor assembly 130 is configured to monitor the angular location of each cord, which corresponds to the orientation of the respective bale wrap assembly relative to the bale wrap support.

In certain embodiments, the controller 108 is configured to determine the angular location of each cord based on feedback from the bale wrap assembly orientation sensor assembly 130. For example, while the bale wrap assembly is in the working location, the controller 108 may control the respective bale wrap mount actuator to drive the bale wrap assembly to rotate until the cord is positioned at an angular location that aligns the cord with the hook. Alternatively, while the bale wrap assembly is in the loading location (e.g., after the shaft of the bale wrap assembly is engaged with the bale wrap mount), the controller 108 may control the respective bale wrap mount actuator to drive the bale wrap assembly to rotate until the cord is positioned at an angular location that causes the cord to align with the hook when the bale wrap assembly reaches the working location.

As previously discussed, in certain embodiments, the storage compartment may include at least one locking mechanism configured to temporarily block rotation of a respective bale wrap assembly. For example, while the bale wrap assembly is in the loading location, the bale wrap assembly may be rotated (e.g., by the respective bale wrap mount actuator) to position the cord such that the cord aligns with the hook when the bale wrap assembly reaches the working location. The controller may then control the locking mechanism, which is communicatively coupled to the controller, to engage to block rotation of the bale wrap assembly. The controller may control the locking mechanism to disengage as/after the bale wrap assembly reaches the working location. In certain embodiments, the locking mechanism may include a clamp configured to engage an end of the bale wrap or the cord, or the locking mechanism may include a locking hook configured to engage the cord. Additionally or alternatively, in certain embodiments, the locking mechanism may include a mechanical stop configured to engage the shaft of the bale wrap assembly to block rotation of the bale wrap assembly. Furthermore, in certain embodiments, the control system may include a sensor configured to detect alignment of the cord with the hook. In such embodiments, the sensor may be communicatively coupled to the controller, and the controller may control the hook actuator to drive the hook to rotate from the storage position to the feeding position in response to detection of the cord/hook alignment.

In certain embodiments, the control system 106 includes a bale wrap presence sensor 132 communicatively coupled to the controller. The bale wrap presence sensor 132 is configured to output a bale wrap presence signal indicative of presence of the bale wrap at the bale wrapping system. As previously discussed, the hook actuator 100 drives the hook to rotate from the storage position to the feeding position, thereby driving the cord to move the bale wrap into engagement with the feed roller(s). The feed roller(s) drive the bale wrap over the wrap guide/wrap applicator (e.g., duckbill). The wrap guide/wrap applicator then moves (e.g., rotates) to direct the bale wrap into contact with the bale. The bale wrap is captured between the bale and the belt(s). Accordingly, rotation of the bale draws the bale wrap around the bale, thereby wrapping the bale. The bale wrap presence sensor 132 may detect presence of the bale wrap between the bale wrap assembly and the feed roller(s), between the feed roller(s) and the wrap guide/wrap applicator, between the wrap guide/wrap applicator and the bale, or a combination thereof. The bale wrap presence sensor 132 may include any suitable type(s) of sensor device(s), such as camera(s), infrared sensor(s), ultrasonic sensor(s), contact sensor(s), other suitable type(s) of sensor device(s), or a combination thereof.

The controller 108 is configured to determine whether the bale wrap of the bale wrap assembly in the working location is depleted based on feedback from the bale wrap presence sensor 132. For example, in response to determining the bale wrap is not present at the bale wrapping system, the controller 108 may determine that the bale wrap is depleted. In response to determining the bale wrap is depleted, the controller 108 may control the user interface 114 to present an indication (e.g., on the display 116) that the bale wrap is depleted. Additionally or alternatively, the controller 108 may control the bale wrap support actuator 76 to drive the bale wrap support to another working angle to position the other bale wrap assembly at the working location. In certain embodiments, the bale wrap presence sensor may be omitted, and the controller may determine the bale wrap is depleted based on an initial quantity of bale wrap of the bale wrap assembly stored within the controller and the number of rotations of the bale wrap assembly (e.g., as monitored by the bale wrap assembly orientation sensor assembly).

As previously discussed, in certain embodiments, the bale wrap assembly loading system includes the arm configured to move each bale wrap assembly from the surface to the loading location. The arm is configured to engage each bale wrap assembly while the bale wrap assembly is on the surface and the arm is in the engagement position, and the arm is configured to disengage the bale wrap assembly while the arm is in the transfer position and the bale wrap assembly is at the loading location. Furthermore, in certain embodiments, the bale wrap assembly loading system includes the arm actuator 82 configured to drive the arm to rotate between the engagement position and the transfer position. In the illustrated embodiment, the arm actuator 82 is communicatively coupled to the controller 108. Accordingly, the controller 108 may control the arm actuator 82 to drive the arm to rotate between the engagement position and the transfer position.

In the illustrated embodiment, the control system 106 includes an arm sensor 134 communicatively coupled to the controller 108. The arm sensor 134 is configured to output an arm position signal indicative of a position of the arm. The arm sensor 134 may include any suitable type(s) of sensor device(s) configured to monitor the position of the arm. For example, in certain embodiments, the arm sensor 134 may include rotary potentiometer(s), LVDT(s), linear potentiometer(s), Hall effect sensor(s), capacitive sensor(s), infrared sensor(s), ultrasonic sensor(s), other suitable type(s) of sensor device(s), or a combination thereof.

In certain embodiments, the controller 108 is configured to determine the position of the arm based on feedback from the arm sensor 134. For example, the controller 108 may determine whether the arm is in the engagement position or the transfer position based on feedback from the arm sensor 134. In certain embodiments, the controller 108 is configured to control the user interface 114 to present an indication (e.g., on the display 116) of the position of the arm (e.g., whether the arm is in the engagement position or in the transfer position). Furthermore, in certain embodiments, the controller 108 is configured to control the arm actuator 82 based on feedback from the arm sensor 134.

In certain embodiments (e.g., in embodiments in which the storage compartment does not include rotary support assembly/assemblies), the controller 108 may determine the bale wrap support is oriented at the first loading angle based on the orientation of the bale wrap support. In addition, the controller may determine the arm is in the transfer position based on the position of the arm, and the controller 108 may identify the first bale wrap assembly mounted on the first bale wrap mount in response to determining the bale wrap support is oriented at the first loading angle and the arm is in the transfer position. Furthermore, the controller 108 may determine the bale wrap support is oriented at the second loading angle based on the orientation of the bale wrap support. The controller 108 may also determine the arm is in the transfer position based on the position of the arm, and the controller 108 may identify the second bale wrap assembly mounted on the second bale wrap mount in response to determining the bale wrap support is oriented at the second loading angle and the arm is in the transfer position. Accordingly, the controller 108 may store the identity of each bale wrap assembly within the storage compartment.

By way of example, during the bale wrap assembly loading process, the controller 108 may determine that the bale wrap support is oriented at the first loading angle based on feedback from the bale wrap support sensor 118. In certain embodiments, the controller 108 may also determine that the arm is in the transfer position based on feedback from the arm sensor 134. Furthermore, in certain embodiments, the controller 108 may determine that the first bale wrap assembly is engaged with the first bale wrap mount based on feedback from the first bale wrap mount sensor 122. The controller 108 may identify the first bale wrap assembly mounted on the first bale wrap mount in response to determining the bale wrap support is oriented at the first loading angle and, in certain embodiments, the arm is in the transfer position and/or the first bale wrap assembly is engaged with the first bale wrap mount. In certain embodiments, the controller 108 may receive a first bale wrap signal (e.g., from the bale identification sensor 120 or the user interface 114) indicative of the type of bale wrap of the first bale rap assembly, and the controller 108 may associate the type of bale wrap of the first bale wrap assembly with the first bale wrap assembly.

The controller 108 may then control the bale wrap support actuator 76 (e.g., based on feedback from the bale wrap support sensor 118) to drive the bale wrap support to rotate to the second loading angle. The controller 108 may determine that the bale wrap support is oriented at the second loading angle based on feedback from the bale wrap support sensor 118. In certain embodiments, the controller 108 may also determine that the arm is in the transfer position based on feedback from the arm sensor 134. Furthermore, in certain embodiments, the controller 108 may determine that the second bale wrap assembly is engaged with the second bale wrap mount based on feedback from the second bale wrap mount sensor 124. The controller 108 may identify the second bale wrap assembly mounted on the second bale wrap mount in response to determining the bale wrap support is oriented at the second loading angle and, in certain embodiments, the arm is in the transfer position and/or the second bale wrap assembly is engaged with the second bale wrap mount. In certain embodiments, the controller 108 may receive a second bale wrap signal (e.g., from the bale identification sensor 120 or the user interface 114) indicative of the type of bale wrap of the second bale rap assembly, and the controller 108 may associate the type of bale wrap of the second bale wrap assembly with the second bale wrap assembly. The controller 108 may then control the actuation assembly 28 (e.g., based on feedback from the storage compartment sensor assembly 126) to move the storage compartment from the loading position to the working position.

As previously discussed, the controller 108 may select the bale wrap usage order based on the types of bale wraps of the bale wrap assemblies, and/or the controller 108 may control the user interface 114 to present the types of bale wraps of the bale wrap assemblies to the operator, thereby enabling the operator to select the order via the user interface 114. In response to selection of the first bale wrap assembly, the controller 108 may control the bale wrap support actuator 76 (e.g., based on feedback from the bale wrap support sensor 118) to rotate the bale wrap support to the first working angle to position the first bale wrap assembly at the working location. In certain embodiments, the controller 108 may control the first bale wrap mount actuator 102 (e.g., based on feedback from the bale wrap orientation sensor assembly 130) to drive the first bale wrap assembly to rotate to align the cord with the hook of the feeding mechanism. The controller 108 may then control the hook actuator 100 (e.g., based on feedback from the feeding mechanism sensor 128) to drive the hook from the storage position to the feeding position.

The controller 108 may determine the bale wrap of the first bale wrap assembly is depleted based on feedback from the bale wrap presence sensor 132. Accordingly, the controller 108 may select the second bale wrap assembly. In response to selection of the second bale wrap assembly, the controller 108 may control the bale wrap support actuator 76 (e.g., based on feedback from the bale wrap support sensor 118) to rotate the bale wrap support to the second working angle to position the second bale wrap assembly at the working location. In certain embodiments, the controller 108 may control the second bale wrap mount actuator 104 (e.g., based on feedback from the bale wrap orientation sensor assembly 130) to drive the second bale wrap assembly to rotate to align the cord with the hook of the feeding mechanism. The controller 108 may then control the hook actuator 100 (e.g., based on feedback from the feeding mechanism sensor 128) to drive the hook from the storage position to the feeding position.

As previously discussed, in certain embodiments, the bale wrap assembly loading system includes the first rotary support assembly rotatably coupled to the bale wrap support (e.g., to the first bale wrap mount). The first rotary support assembly is configured to support one or more first bale wrap assemblies. In addition, the first rotary support assembly includes multiple first bale wrap mounts (e.g., first ancillary bale wrap mounts), and each first bale wrap mount is configured to support a respective first bale wrap assembly. Furthermore, in certain embodiments, the bale wrap assembly loading system includes the second rotary support assembly rotatably coupled to the bale wrap support (e.g., to the second bale wrap mount). The second rotary support assembly is configured to support one or more second bale wrap assemblies. In addition, the second rotary support assembly includes multiple second bale wrap mounts (e.g., second ancillary bale wrap mounts), and each second bale wrap mount is configured to support a respective second bale wrap assembly.

Furthermore, as previously discussed, the first and second rotary support assemblies are positioned on opposite sides of the pivot point. The bale wrap support is configured to rotate about the pivot point to orient the bale wrap support at the first loading angle to facilitate receiving the one or more first bale wrap assemblies at the loading location and to orient the bale wrap support at the second loading angle to facilitate receiving the one or more second bale wrap assemblies at the loading location. In addition, the first rotary support assembly is configured to rotate to position each first bale wrap mount and the corresponding first bale wrap assembly at the loading location while the bale wrap support is oriented at the first loading angle, and the second rotary support assembly is configured to rotate to position each second bale wrap mount and the corresponding second bale wrap assembly at the loading location while the bale wrap support is oriented at the second loading angle.

Each of the sensors and actuators disclosed above with reference to the bale wrap assembly loading system without the rotary support assemblies may be employed within the bale wrap assembly loading system with the rotary support assemblies. For example, the bale wrap assembly loading system with the rotary support assemblies may include the bale wrap support sensor 118, the bale wrap identification sensor 120, the bale wrap mount sensors (e.g., one bale wrap mount sensor for each bale wrap mount), the storage compartment sensor assembly 126, the feeding mechanism sensor 128, the bale wrap assembly orientation sensor assembly 130 (e.g., which may monitor the orientation of each bale wrap assembly within the storage compartment), the bale wrap presence sensor 132, the arm sensor 134, or a combination thereof. Furthermore, the bale wrap assembly loading system with the rotary support assemblies may include the actuation assembly 28 (e.g., with the first actuator 34 and the second actuator 36), the bale wrap support actuator 76, the arm actuator 82, the hook actuator 100, and the bale wrap mount actuators (e.g., one bale wrap mount actuator for each bale wrap mount).

In the illustrated embodiment, the control system 106 also includes a first rotary support sensor 136 and a second rotary support sensor 138. The first rotary support sensor 136 is communicatively coupled to the controller 108, and the second rotary support sensor 138 is communicatively coupled to the controller 108. The first rotary support sensor 136 is configured to output a first rotary support sensor signal indicative of an orientation of the first rotary support assembly, and the second rotary support sensor 138 is configured to output a second rotary support sensor signal indicative of an orientation of the second rotary support assembly. Each rotary support sensor may include any suitable type(s) of sensor device(s) configured to monitor the orientation of the respective rotary support assembly, such as rotary potentiometer(s), infrared sensor(s), camera(s), magnetic sensor(s), other suitable type(s) of sensor device(s), or a combination thereof. The controller 108 is configured to receive the first rotary support sensor signal and the second rotary support sensor signal. In certain embodiments, the controller 108 is configured to control the user interface 114 to present an indication (e.g., on the display 116) of the orientation of the first rotary support assembly and/or the orientation of the second rotary support assembly (e.g., indicating which first bale wrap mount is positioned at the loading location, which first bale wrap mount is positioned at the working location, which second bale wrap mount is positioned at the loading location, which second bale wrap mount is positioned at the working location, or a combination thereof).

As previously discussed, the controller 108 is configured to determine the bale wrap support is oriented at the first loading angle based on the orientation of the bale wrap support. Furthermore, in response to determining the bale wrap support is oriented at the first loading angle, the controller 108 is configured to identify each of the one or more first bale wrap assemblies mounted on the first rotary support assembly based on the orientation of the first rotary support assembly. For example, the controller 108 may identify one of the first bale wrap assemblies mounted on one of the first bale wrap mounts in response to determining the first rotary support assembly is oriented at an angle that positions the respective first bale wrap mount at the loading location. In addition, the controller 108 may identify another of the first bale wrap assemblies mounted on another of the first bale wrap mounts in response to determining the first rotary support assembly is oriented at an angle that positions the respective first bale wrap mount at the loading location.

Furthermore, as previously discussed, the controller 108 is configured to determine the bale wrap support is oriented at the second loading angle based on the orientation of the bale wrap support. In response to determining the bale wrap support is oriented at the second loading angle, the controller 108 is configured to identify each of the one or more second bale wrap assemblies mounted on the second rotary support assembly based on the orientation of the second rotary support assembly. For example, the controller 108 may identify one of the second bale wrap assemblies mounted on one of the second bale wrap mounts in response to determining the second rotary support assembly is oriented at an angle that positions the respective second bale wrap mount at the loading location. In addition, the controller 108 may identify another of the second bale wrap assemblies mounted on another of the second bale wrap mounts in response to determining the second rotary support assembly is oriented at an angle that positions the respective second bale wrap mount at the loading location.

As previously discussed, in certain embodiments, the bale wrap assembly loading system includes the first rotary support actuator 90 and the second rotary support actuator 92. The first rotary support actuator 90 is configured to drive the first rotary support assembly to rotate, and the second rotary support actuator 92 is configured to drive the second rotary support assembly to rotate. In the illustrated embodiment, the first rotary support actuator 90 is communicatively coupled to the controller 108, and the second rotary support actuator 92 is communicatively coupled to the controller 108. In certain embodiments, the controller 108 is configured to control the first rotary support actuator 90 (e.g., based on feedback from the first rotary support sensor 136) to drive the first rotary support assembly to multiple angles to position each first bale wrap mount at the loading location, and/or the controller 108 is configured to control the first rotary support actuator 90 (e.g., based on feedback from the first rotary support sensor 136) to drive the first rotary support assembly to multiple angles to position each first bale wrap mount at the working location. Furthermore, in certain embodiments, the controller 108 is configured to control the second rotary support actuator 92 (e.g., based on feedback from the second rotary support sensor 138) to drive the second rotary support assembly to multiple angles to position each second bale wrap mount at the loading location, and/or the controller 108 is configured to control the second rotary support actuator 92 (e.g., based on feedback from the second rotary support sensor 138) to drive the second rotary support assembly to multiple angles to position each second bale wrap mount at the working location.

In certain embodiments, the controller 108 is configured to receive one or more first bale wrap signals, each indicative of a type of bale wrap of a first bale wrap assembly, and the controller 108 is configured to associate the type of bale wrap of each first bale wrap assembly with the first bale wrap assembly. In addition, the controller 108 is configured to receive one or more second bale wrap signals, each indicative of a type of bale wrap of a second bale wrap assembly, and the controller 108 is configured to associate the type of bale wrap of each second bale wrap assembly with the second bale wrap assembly. As previously discussed with regard to bale wrap types, "associate" refers to the controller 108 storing the type of bale wrap of the respective bale wrap assembly in a manner that links the type of bale wrap with the respective bale wrap assembly.

In certain embodiments, the first bale wrap signal(s) and the second bale wrap signal(s) may be output by the user interface 114. For example, during the bale wrap assembly loading process (e.g., after the controller 108 identifies the bale wrap assembly mounted on the respective bale wrap mount, as the bale wrap assembly is being moved by the arm from the surface to the loading location, etc.), the operator may manually input the type of bale wrap of the respective bale wrap assembly into the user interface 114, and the user interface may output a corresponding bale wrap signal. Furthermore, in certain embodiments, the control system 106 includes the bale identification sensor 120 communicatively coupled to the controller 108. The bale identification sensor 120 is configured to output the first bale wrap signal(s) and the second bale wrap signal(s). In certain embodiments, after the controller 108 associates the type of bale wrap of each bale wrap assembly with the bale wrap assembly, the controller 108 may control the user interface 114 to present an indication (e.g., on the display 116) of the type of bale wrap of the bale wrap assembly.

After the bale wrap assemblies are disposed within the storage compartment, the order of use of the bale wrap assemblies may be selected. For example, in certain embodiments, the controller 108 may control the user interface 114 to present an indication (e.g., on the display 116) of the types of bale wraps of the bale wrap assemblies. In such embodiments, the operator may select the order via input to the user interface 114, and the controller 108 may control the bale wrap support actuator 76 and each rotary support actuator to facilitate use of the bale wrap assemblies in the selected order. Furthermore, in certain embodiments, the controller 108 may automatically select the order based on the types of bale wraps of the bale wrap assemblies. In such embodiments, the controller 108 may control the user interface 114 to present an indication (e.g., on the display 116) of the types of bale wraps of the bale wrap assemblies, and, in certain embodiments, the controller 108 may enable the operator to override the order via the user interface 114 (e.g., before or during the harvesting operation). Furthermore, in certain embodiments, the order may not be determined, and the controller 108 and/or the operator (e.g., via the user interface 114) may select the first/next bale wrap assembly to be used by the bale wrapping system (e.g., after the bale wrap of the previous bale wrap assembly is depleted, before the bale wrap of the previous bale wrap assembly is depleted, etc.).

In certain embodiments, the controller 108 is configured to control the bale wrap support actuator 76 to drive the bale wrap support to the first working angle in response to selection of a first bale wrap assembly. The controller 108 is also configured to control the first rotary support actuator 90 to position the selected first bale wrap assembly, which is mounted to a respective first bale wrap mount, at the working location. In addition, the controller 108 is configured to control the bale wrap support actuator 76 to drive the bale wrap support to the second working angle in response to selection of a second bale wrap assembly. The controller 108 is also configured to control the second rotary support actuator 92 to position the selected second bale wrap assembly, which is mounted to a respective second bale wrap mount, at the working location. The controller 108 may determine which bale wrap assembly is selected based on the order or controller/operator selection, as disclosed above. As previously discussed, with the bale wrap assembly in the working location, the bale wrap of the bale wrap assembly is provided to the bale wrapping system to facilitate wrapping the bale.

The bale wrap assembly loading system with the rotary support assemblies may include the bale wrap mount sensors disclosed above. For example, the control system may include one bale wrap mount sensor for each bale wrap mount. The controller may identify each bale wrap assembly mounted on a respective bale wrap mount based on the orientation of the bale wrap support and the orientation of the respective rotary support assembly, and in response to determining the bale wrap assembly is engaged with the respective bale wrap mount. Furthermore, the bale wrap assembly loading system with the rotary support assemblies may include the arm sensor. The controller may identify each bale wrap assembly mounted on a respective bale wrap mount based on the orientation of the bale wrap support and the orientation of the respective rotary support assembly, and in response to determining the arm is in the transfer position. In addition, in embodiments in which the bale wrap assembly loading system includes the bale wrap mount sensors and the arm sensor, the controller may identify each bale wrap assembly mounted on a respective bale wrap mount based on the orientation of the bale wrap support and the orientation of the respective rotary support assembly, and in response to determining the arm is in the transfer position and the bale wrap assembly is engaged with the respective bale wrap mount. The control system may also include the storage compartment sensor assembly, the feeding mechanism sensor, the bale wrap orientation sensor assembly, the bale wrap presence sensor, or a combination thereof, in which the controller uses feedback from the sensor(s) as disclosed above.

While the bale wrap assembly loading system includes two rotary support assemblies in the embodiment disclosed above, in certain embodiments, the bale wrap assembly loading system may include a single rotary support assembly, as disclosed above with reference to FIG. 4. In the embodiments disclosed above, the control system includes the bale wrap support sensor 118, the bale identification sensor 120, the bale wrap mount sensors, the storage compartment sensor assembly 126, the feeding mechanism sensor 128, the bale wrap assembly orientation sensor assembly 130, the bale wrap presence sensor 132, the arm sensor 134, and, in embodiments having at least one rotary support assembly, the rotary support sensor(s). However, in other embodiments, at least one of the sensors may be omitted. Additionally or alternatively, in certain embodiments, the control system may include at least one additional sensor, such as a bale size sensor, locking mechanism engagement sensor(s), other suitable type(s) of sensor(s), or a combination thereof. Furthermore, in the embodiments disclosed above, the bale wrap assembly loading system includes the actuation assembly 28 (e.g., including the first actuator 34 and the second actuator 36), the bale wrap support actuator 76, the arm actuator 82, the hook actuator 100, the bale wrap mount actuators, and, in embodiments having at least one rotary support assembly, the rotary support actuator(s). However, in other embodiments, at least one of the actuators may be omitted. Additionally or alternatively, in certain embodiments, the bale wrap assembly loading system may include at least one additional actuator.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A bale wrap assembly loading system for an agricultural harvester, comprising:
  a storage compartment configured to store a plurality of bale wrap assemblies, wherein the storage compartment comprises:
    a frame;
    a bale wrap support rotatably coupled to the frame at a pivot point;
    a first bale wrap mount coupled to the bale wrap support and configured to support a first bale wrap assembly of the plurality of bale wrap assemblies; and
    a second bale wrap mount coupled to the bale wrap support and configured to support a second bale wrap assembly of the plurality of bale wrap assemblies, wherein the first and second bale wrap mounts are positioned on opposite sides of the pivot point, and the bale wrap support is configured to rotate about the pivot point to orient the bale wrap support at a first loading angle to facilitate receiving the first bale wrap assembly at a loading location and to orient the bale wrap support at a second loading angle to facilitate receiving the second bale wrap assembly at the loading location;
  a bale wrap support sensor configured to output a bale wrap support sensor signal indicative of an orientation of the bale wrap support; and
  a controller communicatively coupled to the bale wrap support sensor, wherein the controller comprises a processor and a memory, and the controller is configured to:
    determine the bale wrap support is oriented at the first loading angle based on the orientation of the bale wrap support;
    identify the first bale wrap assembly mounted on the first bale wrap mount in response to determining the bale wrap support is oriented at the first loading angle;
    determine the bale wrap support is oriented at the second loading angle based on the orientation of the bale wrap support; and
    identify the second bale wrap assembly mounted on the second bale wrap mount in response to determining the bale wrap support is oriented at the second loading angle.

2. The bale wrap assembly loading system of claim 1, wherein the storage compartment comprises a bale wrap support actuator configured to drive the bale wrap support to rotate, and the bale wrap support actuator is communicatively coupled to the controller; and wherein the controller is configured to control the bale wrap support actuator to drive the bale wrap support to a first working angle to position the first bale wrap assembly at a working location in response to selection of the first bale wrap assembly, and the controller is configured to control the bale wrap support actuator to drive the bale wrap support to a second working angle to position the second bale wrap assembly at the working location in response to selection of the second bale wrap assembly.

3. The bale wrap assembly loading system of claim 1, wherein the controller is configured to:
receive a first bale wrap signal indicative of a type of bale wrap of the first bale wrap assembly;
associate the type of bale wrap of the first bale wrap assembly with the first bale wrap assembly;
receive a second bale wrap signal indicative of a type of bale wrap of the second bale wrap assembly; and
associate the type of bale wrap of the second bale wrap assembly with the second bale wrap assembly.

4. The bale wrap assembly loading system of claim 3, comprising a bale identification sensor communicatively coupled to the controller and configured to output the first bale wrap signal and the second bale wrap signal.

5. The bale wrap assembly loading system of claim 1, comprising:
a first bale wrap mount sensor communicatively coupled to the controller, wherein the first bale wrap mount sensor is configured to output a first bale wrap mount signal indicative of engagement of the first bale wrap assembly with the first bale wrap mount; and
a second bale wrap mount sensor communicatively coupled to the controller, wherein the second bale wrap mount sensor is configured to output a second bale wrap mount signal indicative of engagement of the second bale wrap assembly with the second bale wrap mount;
wherein the controller is configured to identify the first bale wrap assembly mounted on the first bale wrap mount in response to determining the bale wrap support is oriented at the first loading angle and the first bale wrap assembly is engaged with the first bale wrap mount, and the controller is configured to identify the second bale wrap assembly mounted on the second bale wrap mount in response to determining the bale wrap support is oriented at the second loading angle and the second bale wrap assembly is engaged with the second bale wrap mount.

6. The bale wrap assembly loading system of claim 1, wherein the storage compartment is movable relative to a baler of the agricultural harvester, the storage compartment is configured to be positioned proximate to a surface while in a loading position, the storage compartment is configured to be positioned proximate to the baler while in a working position, and the storage compartment is configured to move in an upward direction and in a laterally inward direction from the loading position to the working position.

7. The bale wrap assembly loading system of claim 6, comprising a storage compartment sensor assembly communicatively coupled to the controller, wherein the storage compartment sensor assembly is configured to output a storage compartment sensor signal indicative of a position of the storage compartment relative to the baler, a position of the storage compartment relative to the surface, or a combination thereof.

8. The bale wrap assembly loading system of claim 6, comprising an actuation assembly communicatively coupled to the controller, wherein the controller is configured to control the actuation assembly to drive the storage compartment to move between the loading position and the working position.

9. The bale wrap assembly loading system of claim 1, comprising a feeding mechanism configured to engage a cord of each bale wrap assembly of the plurality of bale wrap assemblies while the bale wrap assembly is in a working location, wherein the feeding mechanism is configured to direct a bale wrap of the bale wrap assembly toward a bale via the cord.

10. The bale wrap assembly loading system of claim 9, comprising a feeding mechanism sensor communicatively coupled to the controller, wherein the feeding mechanism comprises a hook, and the feeding mechanism sensor is configured to output a hook position signal indicative of a position of the hook.

11. A bale wrap assembly loading system for an agricultural harvester, comprising:
a storage compartment configured to store a plurality of bale wrap assemblies, wherein the storage compartment comprises:
a frame;
a bale wrap support rotatably coupled to the frame at a pivot point;
a first bale wrap mount coupled to the bale wrap support and configured to support a first bale wrap assembly of the plurality of bale wrap assemblies; and
a second bale wrap mount coupled to the bale wrap support and configured to support a second bale wrap assembly of the plurality of bale wrap assemblies, wherein the first and second bale wrap mounts are positioned on opposite sides of the pivot point, and the bale wrap support is configured to rotate about the pivot point to orient the bale wrap support at a first loading angle to facilitate receiving the first bale wrap assembly at a loading location and to orient the bale wrap support at a second loading angle to facilitate receiving the second bale wrap assembly at the loading location;
an arm configured to move each bale wrap assembly of the plurality of bale wrap assemblies from a surface to the loading location, wherein the arm is configured to engage each bale wrap assembly of the plurality of bale wrap assemblies while the bale wrap assembly is on the surface and the arm is in an engagement position, and the arm is configured to disengage the bale wrap assembly while the arm is in a transfer position and the bale wrap assembly is at the loading location;
a bale wrap support sensor configured to output a bale wrap support sensor signal indicative of an orientation of the bale wrap support;
an arm sensor configured to output an arm position signal indicative of a position of the arm; and
a controller communicatively coupled to the bale wrap support sensor and the arm sensor, wherein the controller comprises a processor and a memory, and the controller is configured to:
determine the bale wrap support is oriented at the first loading angle based on the orientation of the bale wrap support;
determine the arm is in the transfer position based on the position of the arm;
identify the first bale wrap assembly mounted on the first bale wrap mount in response to determining the bale wrap support is oriented at the first loading angle and the arm is in the transfer position;

determine the bale wrap support is oriented at the second loading angle based on the orientation of the bale wrap support; and identify the second bale wrap assembly mounted on the second bale wrap mount in response to determining the bale wrap support is oriented at the second loading angle and the arm is in the transfer position.

12. The bale wrap assembly loading system of claim 11, comprising an arm actuator communicatively coupled to the controller, wherein the controller is configured to control the arm actuator to drive the arm to rotate between the engagement position and the transfer position.

13. The bale wrap assembly loading system of claim 11, wherein the storage compartment comprises a bale wrap support actuator configured to drive the bale wrap support to rotate, and the bale wrap support actuator is communicatively coupled to the controller; and wherein the controller is configured to control the bale wrap support actuator to drive the bale wrap support to a first working angle to position the first bale wrap assembly at a working location in response to selection of the first bale wrap assembly, and the controller is configured to control the bale wrap support actuator to drive the bale wrap support to a second working angle to position the second bale wrap assembly at the working location in response to selection of the second bale wrap assembly.

14. The bale wrap assembly loading system of claim 11, wherein the controller is configured to:

receive a first bale wrap signal indicative of a type of bale wrap of the first bale wrap assembly;

associate the type of bale wrap of the first bale wrap assembly with the first bale wrap assembly;

receive a second bale wrap signal indicative of a type of bale wrap of the second bale wrap assembly; and associate the type of bale wrap of the second bale wrap assembly with the second bale wrap assembly.

15. The bale wrap assembly loading system of claim 11, wherein the storage compartment is movable relative to a baler of the agricultural harvester, the storage compartment is configured to be positioned proximate to the surface while in a loading position, the storage compartment is configured to be positioned proximate to the baler while in a working position, and the storage compartment is configured to move in an upward direction and in a laterally inward direction from the loading position to the working position.

16. A bale wrap assembly loading system for an agricultural harvester, comprising:

a storage compartment configured to store a plurality of bale wrap assemblies, wherein the storage compartment comprises:

a frame;

a bale wrap support rotatably coupled to the frame at a pivot point;

a first rotary support assembly rotatably coupled to the bale wrap support and configured to support one or more first bale wrap assemblies of the plurality of bale wrap assemblies, wherein the first rotary support assembly comprises a plurality of first bale wrap mounts, each first bale wrap mount of the plurality of first bale wrap mounts is configured to support a first bale wrap assembly of the one or more first bale wrap assemblies; and a second rotary support assembly rotatably coupled to the bale wrap support and configured to support one or more second bale wrap assemblies of the plurality of bale wrap assemblies, wherein the second rotary support assembly comprises a plurality of second bale wrap mounts, each second bale wrap mount of the plurality of second bale wrap mounts is configured to support a second bale wrap assembly of the one or more second bale wrap assemblies, the first and second bale wrap rotary support assemblies are positioned on opposite sides of the pivot point, the bale wrap support is configured to rotate about the pivot point to orient the bale wrap support at a first loading angle to facilitate receiving the one or more first bale wrap assemblies at a loading location and to orient the bale wrap support at a second loading angle to facilitate receiving the one or more second bale wrap assemblies at the loading location, the first rotary support assembly is configured to rotate to position each first bale wrap mount of the plurality of first bale wrap mounts at the loading location while the bale wrap support is oriented at the first loading angle, and the second rotary support assembly is configured to rotate to position each second bale wrap mount of the plurality of second bale wrap mounts at the loading location while the bale wrap support is oriented at the second loading angle;

a bale wrap support sensor configured to output a bale wrap support sensor signal indicative of an orientation of the bale wrap support;

a first rotary support sensor configured to output a first rotary support sensor signal indicative of an orientation of the first rotary support assembly;

a second rotary support sensor configured to output a second rotary support sensor signal indicative of an orientation of the second rotary support assembly; and a controller communicatively coupled to the bale wrap support sensor, to the first rotary support sensor, and to the second rotary support sensor, wherein the controller comprises a processor and a memory, and the controller is configured to:

determine the bale wrap support is oriented at the first loading angle based on the orientation of the bale wrap support;

in response to determining the bale wrap support is oriented at the first loading angle, identify each of the one or more first bale wrap assemblies mounted on the first rotary support assembly based on the orientation of the first rotary support assembly;

determine the bale wrap support is oriented at the second loading angle based on the orientation of the bale wrap support; and in response to determining the bale wrap support is oriented at the second loading angle, identify each of the one or more second bale wrap assemblies mounted on the second rotary support assembly based on the orientation of the second rotary support assembly.

17. The bale wrap assembly loading system of claim 16, comprising:

a first rotary support actuator communicatively coupled to the controller, wherein the controller is configured to control the first rotary support actuator to drive the first rotary support assembly to rotate; and a second rotary support actuator communicatively coupled to the controller, wherein the controller is configured to control the second rotary support actuator to drive the second rotary support assembly to rotate.

18. The bale wrap assembly loading system of claim 16, wherein the controller is configured to:
- receive one or more first bale wrap signals, each indicative of a type of bale wrap of a first bale wrap assembly of the one or more first bale wrap assemblies;
- associate the type of bale wrap of each first bale wrap assembly of the one or more first bale wrap assemblies with the first bale wrap assembly;
- receive one or more second bale wrap signals, each indicative of a type of bale wrap of a second bale wrap assembly of the one or more second bale wrap assemblies; and
- associate the type of bale wrap of each second bale wrap assembly of the one or more second bale wrap assemblies with the second bale wrap assembly.

19. The bale wrap assembly loading system of claim 16, wherein the storage compartment is movable relative to a baler of the agricultural harvester, the storage compartment is configured to be positioned proximate to a surface while in a loading position, the storage compartment is configured to be positioned proximate to the baler while in a working position, and the storage compartment is configured to move in an upward direction and in a laterally inward direction from the loading position to the working position.

20. The bale wrap assembly loading system of claim 16, comprising a feeding mechanism configured to engage a cord of each bale wrap assembly of the plurality of bale wrap assemblies while the bale wrap assembly is in a working location, wherein the feeding mechanism is configured to direct a bale wrap of the bale wrap assembly toward a bale via the cord.

* * * * *